US012521859B2

(12) United States Patent  
Li et al.

(10) Patent No.: US 12,521,859 B2
(45) Date of Patent: Jan. 13, 2026

(54) NAIL GUN AND CONTROL METHOD THEREOF

(71) Applicant: Nanjing Chervon Industry Co., Ltd., Nanjing (CN)

(72) Inventors: Guang Li, Nanjing (CN); Xiaobo Yu, Nanjing (CN); Yongkang Wu, Nanjing (CN); Yuemei Min, Nanjing (CN); Longxiang Liu, Nanjing (CN); Tianxiao Xu, Nanjing (CN); Qi Du, Nanjing (CN); Guangcheng Sun, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 19/191,413

(22) Filed: Apr. 28, 2025

(65) Prior Publication Data

US 2025/0256382 A1 Aug. 14, 2025

Related U.S. Application Data

(63) Continuation of application No. PCT/CN2024/107478, filed on Jul. 25, 2024.

(30) Foreign Application Priority Data

Aug. 30, 2023 (CN) .......................... 202311107865.3
Aug. 30, 2023 (CN) .......................... 202311107885.0
(Continued)

(51) Int. Cl.
*B25C 1/06* (2006.01)
*B25C 1/00* (2006.01)
*B25C 7/00* (2006.01)

(52) U.S. Cl.
CPC ................ *B25C 1/06* (2013.01); *B25C 1/008* (2013.01); *B25C 7/00* (2013.01)

(58) Field of Classification Search
CPC ... B25C 1/06; B25C 1/008; B25F 5/00; B25F 5/001; B25F 5/02; B25F 5/021;
(Continued)

(56) References Cited

U.S. PATENT DOCUMENTS

2008/0229729 A1  9/2008 Naik
2015/0137715 A1* 5/2015 Brotto .................. H02J 7/0019
                                                  318/139
(Continued)

FOREIGN PATENT DOCUMENTS

CN  114851136 A * 8/2022 ................ H02P 3/18
CN  116000875 A    4/2023
(Continued)

OTHER PUBLICATIONS

Machine Translation of CN-1148511360-A (Year: 2022).*
(Continued)

*Primary Examiner* — Veronica Martin
(74) *Attorney, Agent, or Firm* — Greenberg Traurig, LLP

(57) ABSTRACT

A nail gun includes a housing; an electric motor disposed in the housing; a battery pack configured to power the electric motor; a firing assembly configured to be capable of moving from an initial position to a firing position to drive a nail into a workpiece and moving from the firing position to the initial position within a nailing cycle; a parameter detection unit connected to at least the electric motor and configured to detect at least a working parameter of the electric motor; and a controller connected to at least the parameter detection unit. The controller is configured to, if the working parameter of the electric motor in a startup process is less than or equal to a parameter threshold, restrict a maximum duty
(Continued)

cycle of a startup control signal to being less than or equal to a duty cycle threshold.

20 Claims, 16 Drawing Sheets

(30) Foreign Application Priority Data

| | | |
|---|---|---|
| Aug. 30, 2023 | (CN) | ............................ 202311109669.X |
| Aug. 30, 2023 | (CN) | ............................ 202311110798.0 |
| Aug. 30, 2023 | (CN) | ............................ 202311111812.9 |
| Aug. 30, 2023 | (CN) | ............................ 202311113106.8 |
| Aug. 30, 2023 | (CN) | ............................ 202311114950.2 |
| Sep. 21, 2023 | (CN) | ............................ 202311224063.0 |
| Sep. 21, 2023 | (CN) | ............................ 202311225795.1 |
| Sep. 21, 2023 | (CN) | ............................ 202311226824.6 |

(58) Field of Classification Search
 CPC ... B25F 3/00; B25F 1/00; B25B 21/00; B25B 23/147; B25B 23/1475; B25B 23/14
 See application file for complete search history.

(56) References Cited

U.S. PATENT DOCUMENTS

| | | |
|---|---|---|
| 2020/0338708 A1 | 10/2020 | Po |
| 2021/0021215 A1 | 1/2021 | Tsai |
| 2023/0415319 A1 | 12/2023 | Tsai |

FOREIGN PATENT DOCUMENTS

| | | |
|---|---|---|
| JP | 2012196763 A | 10/2012 |
| WO | 2023024733 A1 | 3/2023 |

OTHER PUBLICATIONS

International Search and Written Opinion of application No. PCT/CN2024/107478, dated Oct. 26, 2024, 6 pp.
International Search Report of application number PCT/CN2024/107441, dated Mar. 6, 2025, 6 pp.

* cited by examiner

NAIL GUN AND CONTROL METHOD THEREOF

RELATED APPLICATION INFORMATION

This application is a continuation of International Application Number PCT/CN2024/107478, filed on Jul. 25, 2024, through which this application also claims the benefit under 35 U.S.C. § 119(a) of Chinese Patent Application No. 202311113106.8, filed on Aug. 30, 2023, Chinese Patent Application No. 202311109669.X, filed on Aug. 30, 2023, Chinese Patent Application No. 202311110798.0, filed on Aug. 30, 2023, Chinese Patent Application No. 202311107865.3, filed on Aug. 30, 2023, Chinese Patent Application No. 202311114950.2, filed on Aug. 30, 2023, Chinese Patent Application No. 202311111812.9, filed on Aug. 30, 2023, Chinese Patent Application No. 202311107885.0, filed on Aug. 30, 2023, and Chinese Patent Application No. 202311224063.0, filed on Sep. 21, 2023, Chinese Patent Application No. 202311225795.1, filed on Sep. 21, 2023, and Chinese Patent Application No. 202311226824.6, filed on Sep. 21, 2023, which applications are incorporated herein by reference in their entireties.

TECHNICAL FIELD

The present application relates to the technical field of power tools, for example, a nail gun.

BACKGROUND

Some power tools require a relatively high startup acceleration to start up, the duty cycle of a startup control signal increases to a target value in a short time, and a relatively large startup current appears in the startup process. If the power tools start up with a locked rotor or a heavy load, even if the duty cycle increases to the maximum, an electric motor may still fail to start, and overcurrent protection may not be performed and fail to respond to an instantaneous high current in time so that the machine may be burnt. The safety of startup control is particularly important for power tools that need to start and stop frequently, such as nail guns.

This part provides background information related to the present application, and the background information is not necessarily the existing art.

SUMMARY

A nail gun includes a housing; an electric motor disposed in the housing; a battery pack configured to power the electric motor; a firing assembly configured to be capable of moving from an initial position to a firing position to drive a nail into a workpiece and moving from the firing position to the initial position within a nailing cycle; a parameter detection unit connected to at least the electric motor and configured to detect at least a working parameter of the electric motor; and a controller connected to at least the parameter detection unit. The controller is configured to, if the working parameter of the electric motor in a startup process is less than or equal to a parameter threshold, restrict a maximum duty cycle of a startup control signal to being less than or equal to a duty cycle threshold.

In some examples, the controller is configured to set the duty cycle threshold according to at least a battery parameter of the battery pack.

In some examples, the working parameter of the electric motor includes at least one of a rotational speed, number of revolutions, startup current, and startup voltage of the electric motor.

In some examples, the battery parameter of the battery pack includes at least one of electric power, a voltage, a temperature, a cell, and the number of parallel cells.

In some examples, the duty cycle threshold is inversely correlated to at least one battery parameter.

In some examples, the parameter threshold includes a minimum rotational speed of the electric motor during startup with a locked rotor.

In some examples, the parameter threshold includes a minimum number of revolutions of the electric motor during startup with a locked rotor.

In some examples, the parameter threshold includes a minimum rotational speed of the electric motor during startup with a heavy load.

In some examples, the parameter threshold includes a minimum number of revolutions of the electric motor during startup with a heavy load.

A power tool includes a housing; an electric motor disposed in the housing; a battery pack configured to power the electric motor; a parameter detection unit connected to at least the electric motor and configured to detect at least a working parameter of the electric motor; and a controller connected to at least the parameter detection unit. The controller is configured to, if the working parameter of the electric motor in a startup process is less than or equal to a parameter threshold, restrict a maximum duty cycle of a startup control signal to being less than or equal to a duty cycle threshold.

In some examples, the controller is configured to set the duty cycle threshold according to at least a battery parameter of the battery pack.

In some examples, the working parameter of the electric motor includes at least one of a rotational speed, number of revolutions, startup current, and startup voltage of the electric motor.

In some examples, the battery parameter of the battery pack includes at least one of electric power, a voltage, a temperature, a cell, and the number of parallel cells.

In some examples, the duty cycle threshold is inversely correlated to at least one battery parameter.

In some examples, the parameter threshold includes a minimum rotational speed of the electric motor during startup with a locked rotor.

In some examples, the parameter threshold includes a minimum number of revolutions of the electric motor during startup with a locked rotor.

A control method of a nail gun is provided. The nail gun includes a housing; an electric motor disposed in the housing; a battery pack configured to power the electric motor; a firing assembly configured to be capable of moving from an initial position to a firing position to drive a nail into a workpiece and moving from the firing position to the initial position within a nailing cycle; a parameter detection unit connected to at least the electric motor and configured to detect at least a working parameter of the electric motor; and a controller connected to at least the parameter detection unit. The control method includes: if the working parameter of the electric motor in a startup process is less than or equal to a parameter threshold, restricting a maximum duty cycle of a startup control signal to being less than or equal to a duty cycle threshold.

In some examples, the method further includes: setting the duty cycle threshold according to at least a battery parameter of the battery pack.

BRIEF DESCRIPTION OF THE DRAWINGS

To illustrate technical solutions in examples of the present application more clearly, the drawings used in the description of the examples are briefly described below. Apparently, the drawings described below illustrate only part of examples of the present application, and those of ordinary skill in the art may obtain other drawings based on the drawings described below on the premise that no creative work is done.

DETAILED DESCRIPTION

Figure 1:
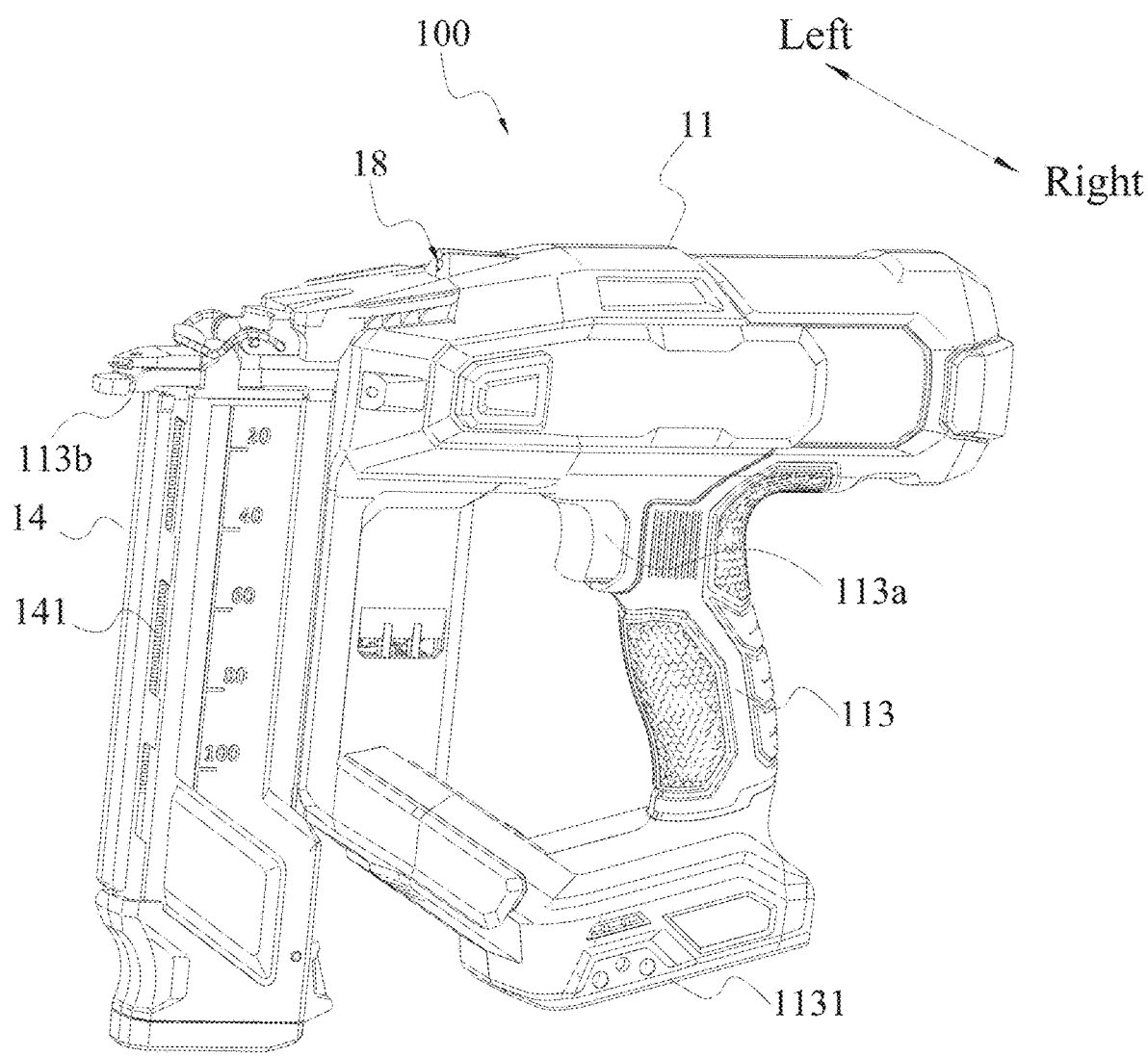
FIG. 1 is a perspective view of a nail gun.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

As for the definitions of up, down, left, right, front, and rear in the present application, reference may be made to the orientations shown in FIGS. 1 to 4.

Figure 2:
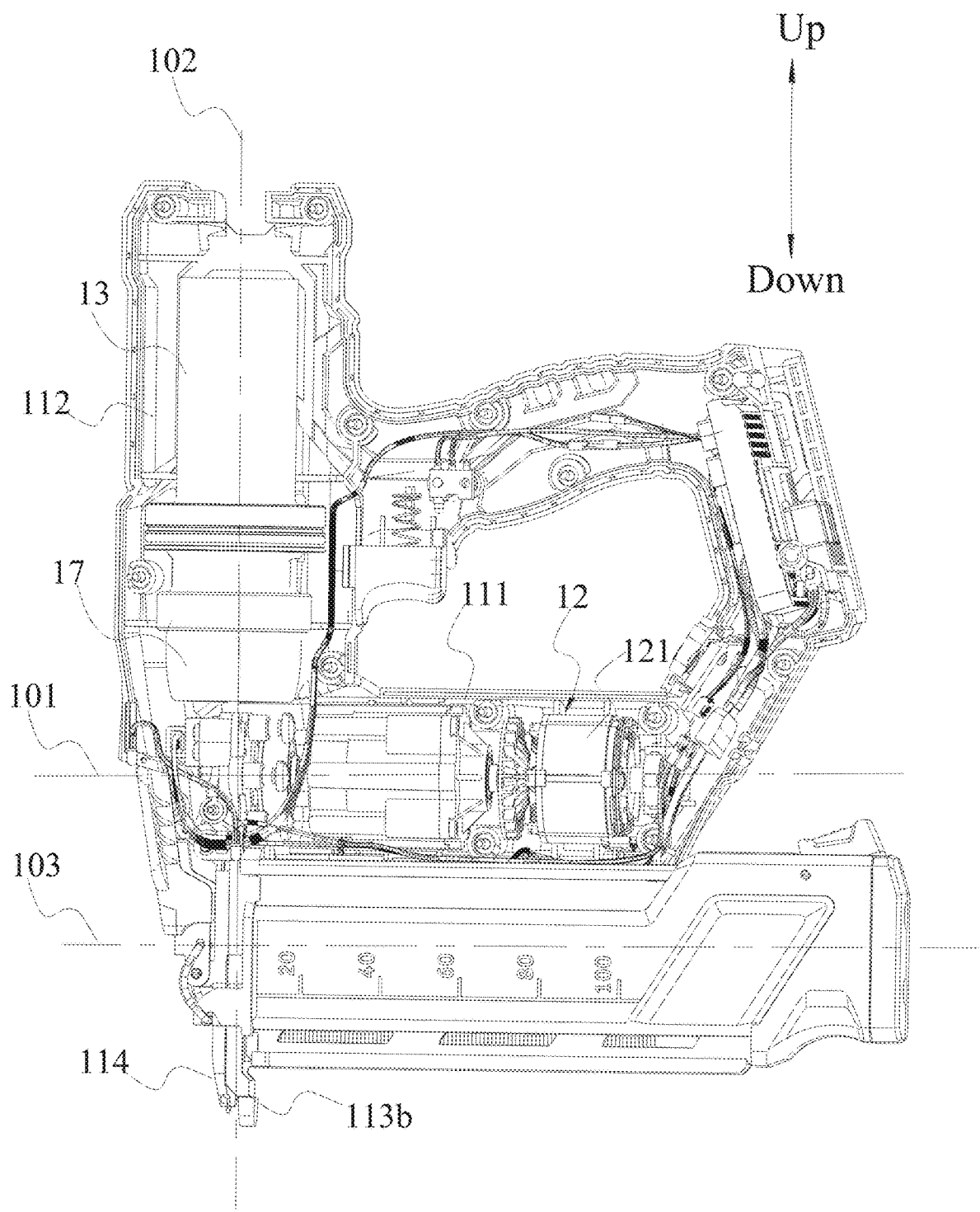
FIG. 2 is a sectional view of the nail gun of FIG. 1.

As shown in FIGS. 1 and 2, a nail gun 100 includes a housing 11, a power output portion 12, a cylinder 13, and a magazine assembly 14. The housing 11 includes a first accommodation space 111 extending along a direction of a first straight line 101 and a second accommodation space 112 extending along a direction of a second straight line 102. In an example, the power output portion 12 may be partially disposed in the first accommodation space 111 or partially disposed in the second accommodation space 112. In an example, the power output portion 12 may include an electric motor 121 or an energy storage device. The energy storage device may be understood as one that releases stored kinetic energy during the first half of a nailing cycle to achieve nailing and stores energy during the second half of the nailing cycle to prepare for the next nailing. The energy storage device may be a cylinder capable of pre-storing gas, a cylinder capable of inflation and deflation during working, or an elastic element such as a spring. In this example, a cylinder 13 serves as the energy storage device and is disposed in the second accommodation space 112.

The housing 11 is further formed with a handle portion 113 for a user to hold. A power interface 1131 is provided at an end of the handle portion 113 and configured to connect a direct current or alternating current power supply. In this example, the power interface 1131 is configured to connect a battery pack 15. A main switch 113a is provided on the handle portion 113 and used for the user to control the start and stop of the nail gun 100.

The other end of the handle portion 113 is connected to the cylinder 13, and the cylinder 13 extends along the direction of the second straight line 102, where the first straight line 101 and the second straight line 102 are perpendicular to each other. The magazine assembly 14 is disposed along a direction of a third straight line 103 parallel to the first straight line 101. As an optional example, the magazine assembly 14 is provided with a window 141 for the user to observe the remaining nails. The window 141 is configured to be one or more gaps on the magazine assembly 14. In one aspect, the window 141 may be used for the user to check the number of the remaining nails. In the other aspect, the window 141 may be used for the user to perform simple maintenance on the magazine assembly 14 without detaching the magazine assembly 14.

A firing assembly 16 is disposed in the cylinder 13, and gas in the cylinder 13 does work to push the firing assembly 16 to move, thereby driving a nail. The nail gun 100 further includes a striking portion 17. The striking portion 17 is at least partially disposed in the cylinder 13 and may be, for example, a piston disposed in the cylinder 13 and connected to the firing assembly 16. The striking portion 17 may be connected to the firing assembly 16 and can strike the firing assembly 16 so that the firing assembly 16 moves within the cylinder 13. In an example, the cylinder 13 further includes an inflation nozzle configured to pre-fill gas into the cylinder 13. The pre-filled gas in a compressed state stores a relatively large amount of kinetic energy and can push the striking portion 17 to quickly strike the firing assembly 16 so that the firing assembly 16 drives the nail. Alternatively, the cylinder 13 may include an air intake nozzle and an air exhaust nozzle so that the cylinder 13 does not need to be pre-filled with gas and may be inflated in a working process of the nail gun 100.

Figure 3:
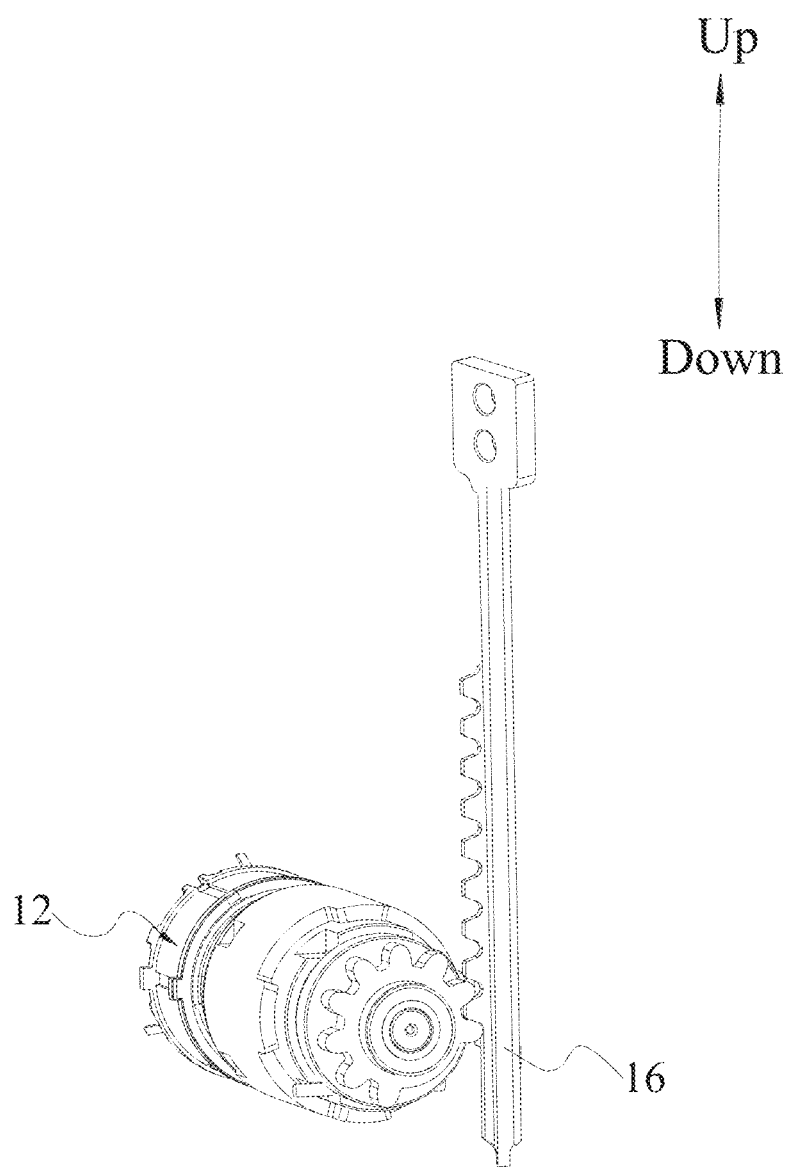
FIG. 3 is a schematic view of internal structures of the nail gun of FIG. 1 at an initial position.

The cylinder 13 that can be pre-filled with gas is used as an example here. After the nail gun 100 shuts down, the electric motor 121 stops outputting power and can make the firing assembly 16 stop at the initial position. The pre-filled gas in the cylinder 13 is in the compressed state. After the nail gun 100 is powered on and the electric motor is started, the electric motor 121 outputs power, the firing assembly 16 is released, and the striking portion 17 can convert the kinetic energy of the cylinder 13 into a striking force for striking the firing assembly 16 so that the firing assembly 16 obtains instantaneously a relatively large acceleration, moves to a firing position shown in FIG. 4, and drives the nail. After the nail is driven out, the firing assembly 16 is driven by the electric motor 121 to return from the firing position shown in FIG. 4 to an initial position shown in FIG. 3 and shuts down, during which the firing assembly 16 can continuously drive the striking portion 17 to compress the gas in the cylinder 13. A process from the startup of the nail gun to when the firing assembly 16 returns to the initial position or the proximity of the initial position, that is, a shutdown position after nailing is referred to as a nailing cycle. It is to be noted that the initial position shown in FIG. 3 is a position at which the firing assembly 16 stops after the nail gun 100 shuts down and may also be referred to as the shutdown position. A position to which the firing assembly 16 can move upward farthest may be referred to as a top dead point, and a position to which the firing assembly 16 can move downward farthest is referred to as a bottom dead point. The firing position and the bottom dead point may be the same position, while the initial position approaches the top dead point from bottom to top but is not the top dead point, that is to say, the distance between the initial position and the top dead point is greater than 0.

As shown in FIG. 2, the electric motor 121 extends basically along the direction of the first straight line 101, and the cylinder 13 and the firing assembly 16 disposed in the cylinder 13 extend basically along the direction of the second straight line 102. The electric motor 121 and the cylinder 13 are basically perpendicular to each other. The electric motor 121 drives the firing assembly 16 to move within the cylinder 13. In an optional implementation, the electric motor 121 may be part of the electric motor 121. The electric motor 121 can output power to a drive shaft 124, and a drive wheel 125 is disposed on the drive shaft 124. The firing assembly 16 includes at least a striker 161. In an example, the firing assembly 16 may further include the striking portion 17, where the striking portion 17 may be a piston connected to the top of the striker 161. The piston is fixedly or detachably connected to the striker 161. The striking portion 17 can compress the pre-filled gas in the cylinder 13 in the process of the striker 161 being driven to move upward, that is, towards the initial position. The striker 161 is formed with transmission teeth 161a, and the striker 161 can move along the direction of the second straight line 102 within the cylinder 13, where the second straight line 102 may be understood as a nailing direction. The drive wheel 125 can mate with the transmission teeth 161a to drive the firing assembly 16 to do work against pressure in the cylinder 13 so that the firing assembly 16 can move to the initial position shown in FIG. 3.

Figure 4:
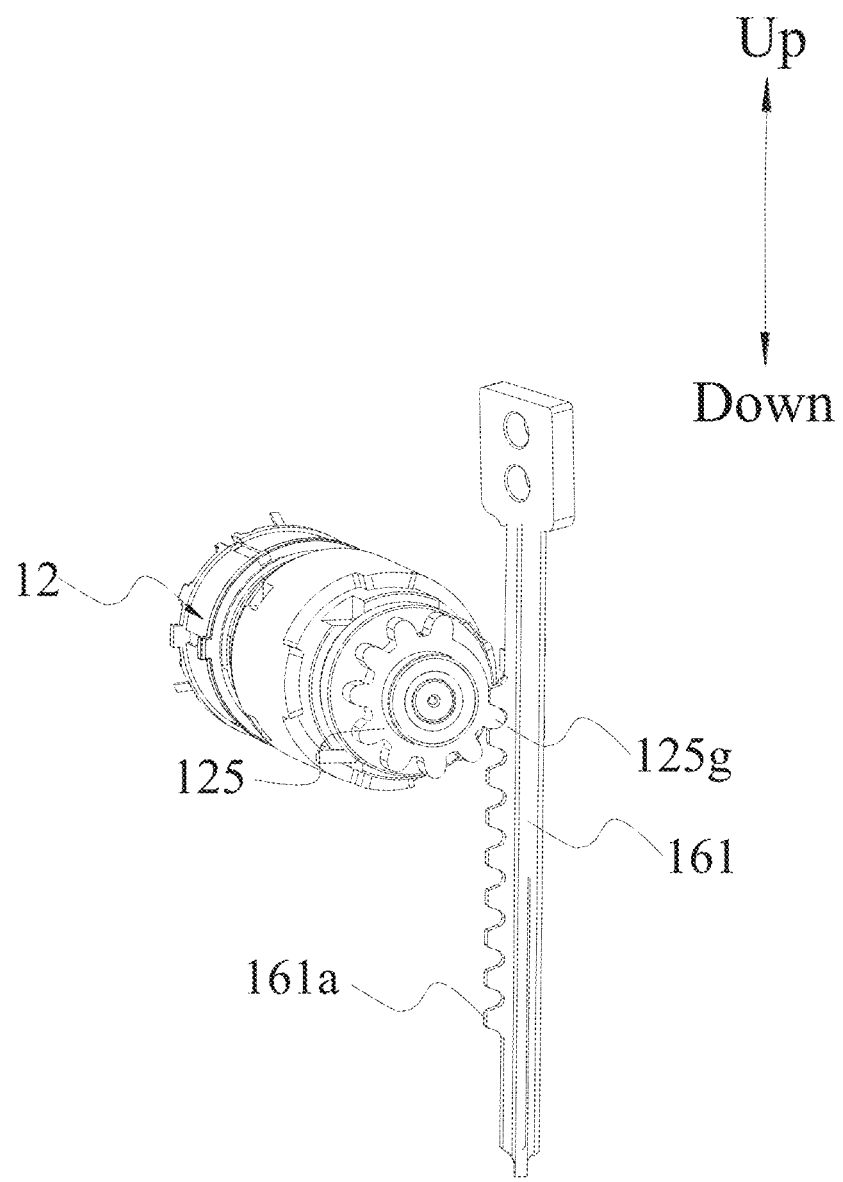
FIG. 4 is a schematic view of internal structures of the nail gun of FIG. 1 at a firing position.
Figure 5:
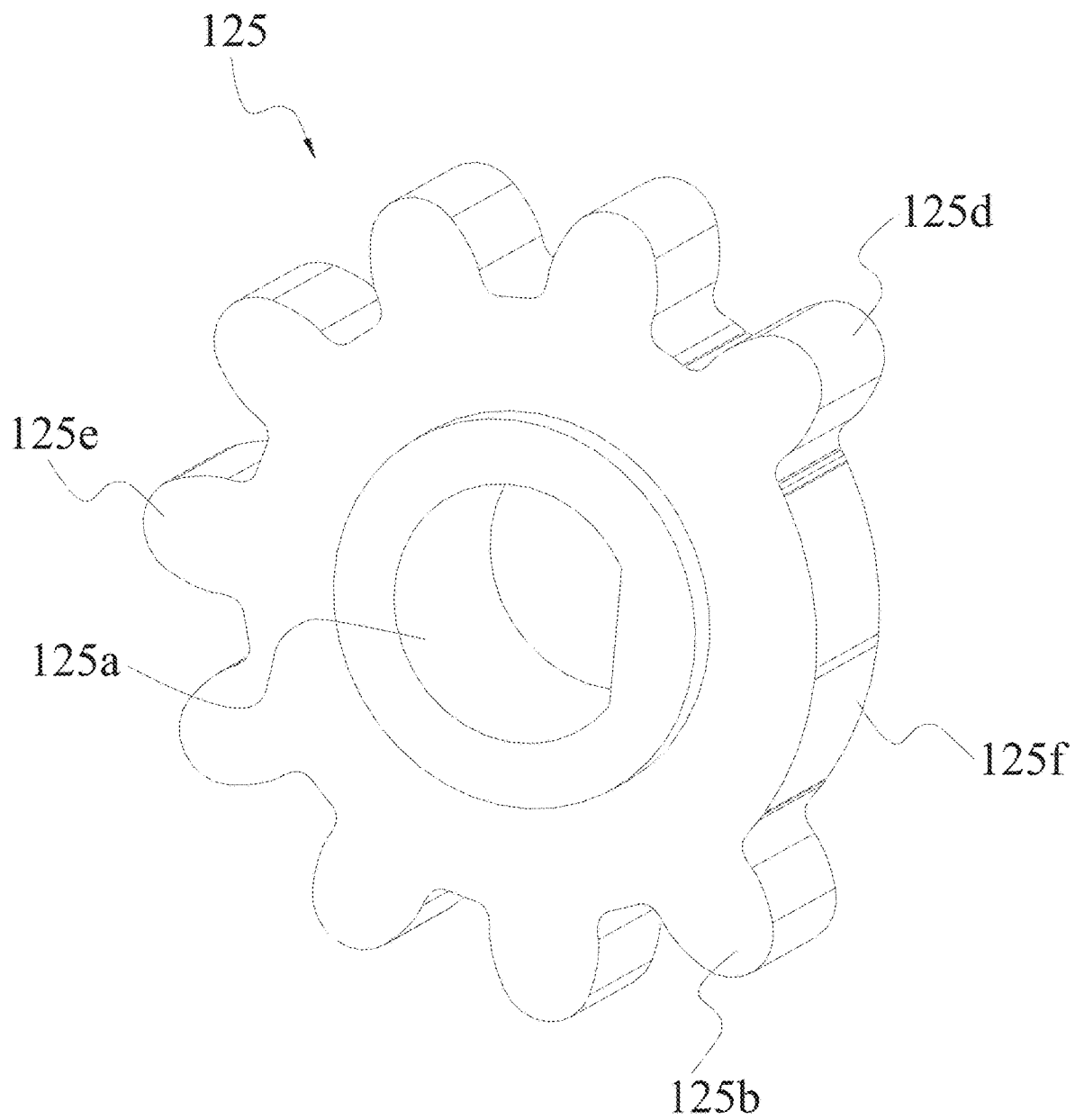
FIG. 5 is a perspective view of a drive wheel of the nail gun of FIG. 1.

As shown in FIGS. 4 and 5, the drive wheel 125 is a gear structure. The drive wheel 125 is formed with a second connecting hole 125a for the drive shaft 124 to be connected to. The second connecting hole 125a is specifically a flat hole. When the drive shaft 124 is connected to the second connecting hole 125a, the drive wheel 125 can rotate synchronously with the drive shaft 124. Multiple drive teeth 125g are formed around a body portion of the drive wheel 125, and the drive teeth 125g include a first tooth 125b at a starting end and a second tooth 125d at a tail end. Here, a drive tooth 125g that first contacts the striker 161 of the firing assembly 16 when the drive wheel 125 starts driving the firing assembly 16 to reset to the initial position shown in FIG. 3 is defined as the first tooth 125b, and a drive tooth 125g that last meshes with the striker 161 of the firing assembly 16 when the firing assembly 16 is already at the initial position is defined as the second tooth 125d. A first section 125e and a second section 125f are included between the first tooth 125b and the second tooth 125d. The multiple drive teeth 125g are evenly distributed on the first section 125e; and the second section 125f is smooth and continuous without any drive teeth 125g. When the drive teeth 125g on the first section 125e mesh with the transmission teeth 161a on the striker 161, the drive wheel 125 can drive the striker 161 to compress the gas in the cylinder 13 and do work. When the second section 125f mates with the striker 161, since the second section 125f is smooth and continuous, the striker 161 is not stopped by the drive teeth 125g and is rapidly pushed out by the gas in the cylinder 13, achieving the nailing effect.

In other examples, the drive wheel 125 may be another form of drive component, and the structures and forms of other possible drive wheels 125 are not specifically limited in the present application.

Figure 6:
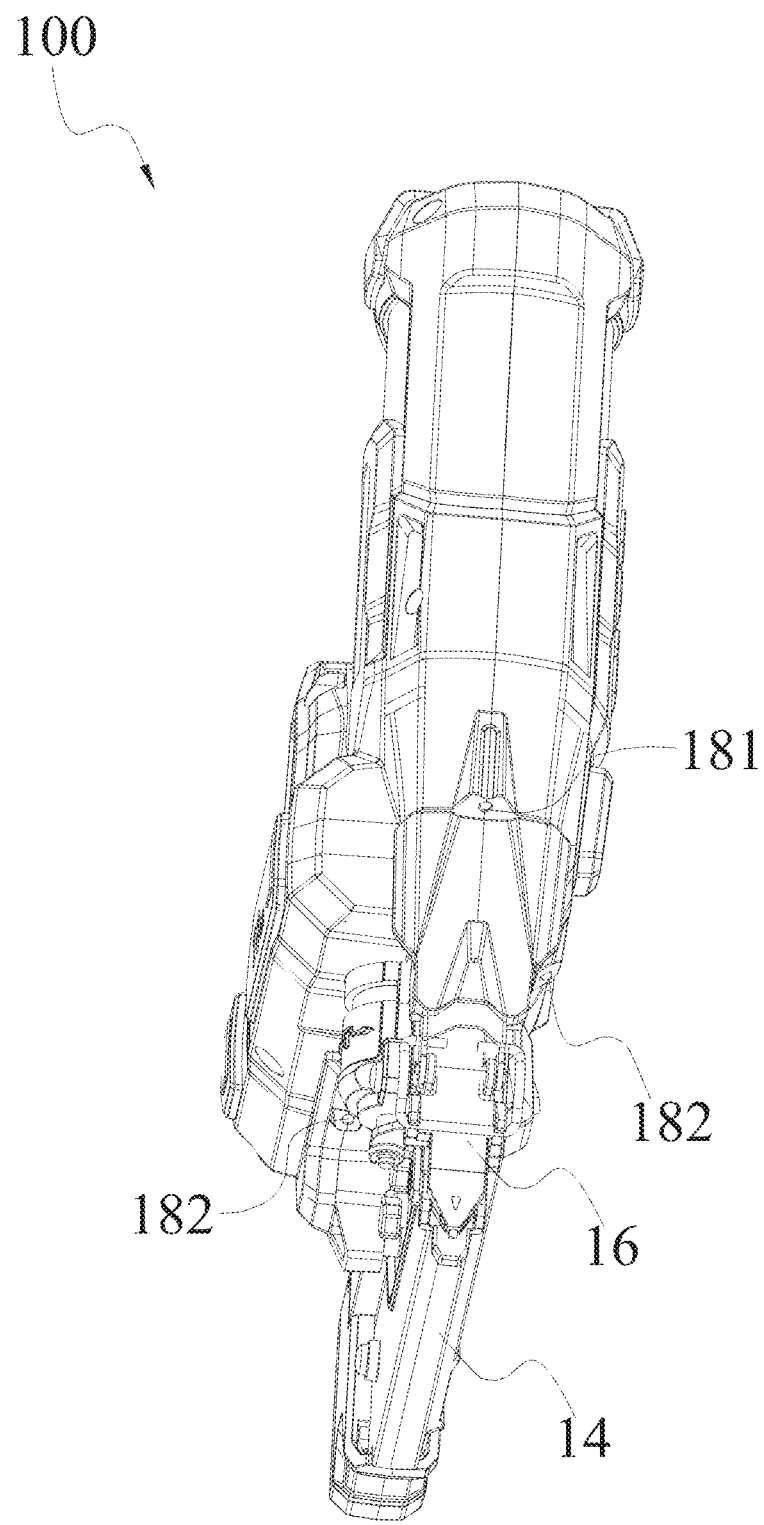
FIG. 6 is another perspective view of a nail gun.

In this example, the nail gun 100 is provided with a light-emitting device 18. The light-emitting device 18 may be one or more light-emitting diode (LED) lamp beads arranged at different positions, a light strip, a Nixie tube, or a display screen. As shown in FIG. 6, the light-emitting device 18 includes three LED lamps disposed on the housing 11. One light-emitting device 181 is disposed directly above a horizontal plane where the striker 161 is located, and the other two light-emitting devices 182 can collaborate with the light-emitting device 181 to project a V-shaped, arrow-shaped, or triangular light spot on a workpiece to be nailed, where the light spot can indicate a nailing position on the workpiece. In an implementation, the other two light-emitting devices 182 are disposed on the left and right sides of the front end of the housing 11 of the nail gun 100.

As is known, after the nail gun is used for a long time, the cylinder 13 may experience air leakage due to a material or sealing issue. If the cylinder 13 leaks, the pre-filled gas in the cylinder 13 is reduced, or insufficient inflation may occur in a working process of the cylinder 13. Thus, the compressed gas has reduced kinetic energy, and the nailing strength or depth of the nail gun is affected. Moreover, when the electric motor 121 outputs the same power to drive the firing assembly 16 to return to the initial position, that is, the shutdown position, due to the reduced gas in the cylinder 13, the firing assembly 16 may fail to shut down when reaching the initial position, causing a safety hazard. Similarly, after the nail gun with the energy storage device being the elastic element such as the spring is used for a long time, an elastic force of the spring may degrade, and the spring has reduced kinetic energy, that is, elastic energy after being compressed, which also affects the nailing strength or depth or causes a safety hazard.

To solve the preceding problem, it is necessary to accurately detect whether the cylinder leaks or whether the elastic force of the spring degrades and to issue a timely alarm for maintenance after it is determined that the cylinder leaks or the elastic force degrades.

Figure 7:
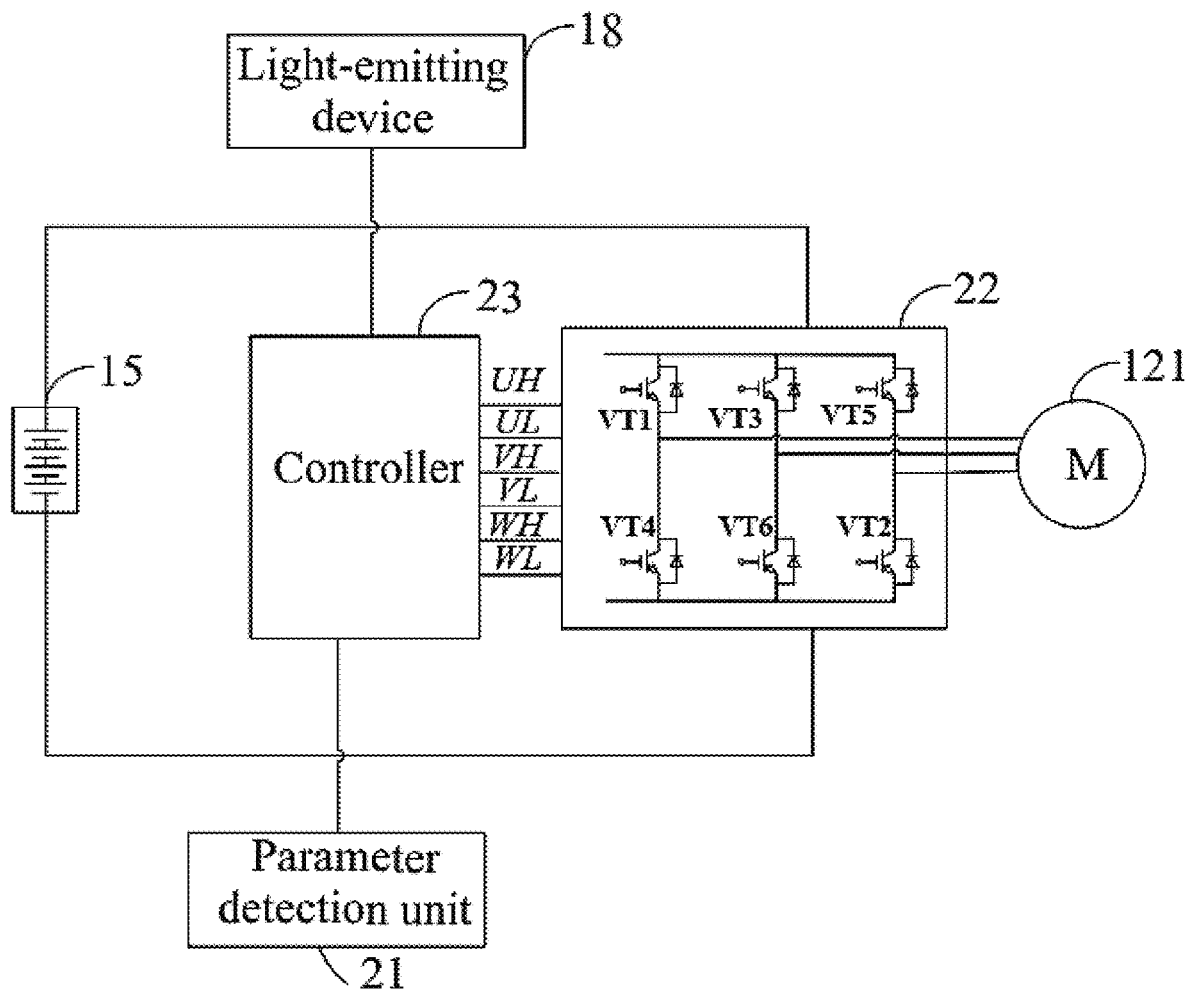
FIG. 7 is a circuit schematic of a nail gun according to an example.

As shown in FIG. 7, a control circuit 200 of the nail gun may include at least a parameter detection unit 21, a driver circuit 22, a controller 23, the light-emitting device 18, and the electric motor 121. As a power supply for the control circuit 200, the battery pack 15 can not only provide electrical energy for driving the electric motor 121 but also provide electrical energy at a low voltage for the controller 23 after conversion by a power conversion unit, provide electrical energy for the parameter detection unit 21, or provide electrical energy for the light-emitting device 18. This example illustrates only a power supply path for the battery pack 15 to provide electrical energy for the electric motor 121 and omits a detailed description of other possible power supply paths.

In an example, the driver circuit 22 is connected between the controller 23 and the electric motor 121 and may receive control signals output from the controller 23 and change its own conduction state, so as to control an operating state of the electric motor 121, including, for example, shutdown, rotation, a rotational speed, or a direction of rotation. Optionally, the driver circuit 22 may consist of one or more power elements. In an example, as shown in FIG. 7, the driver circuit 22 includes multiple power elements VT1, VT2, VT3, VT4, VT5, and VT6. Each gate terminal of the power elements is electrically connected to the controller 23 and configured to receive a control signal from the controller 23. Each drain or source of the power elements is connected to a stator winding of the electric motor 121. The power elements VT1 to VT6 receive the control signals from the controller 23 to change their respective on states, thereby changing a current loaded to stator windings of the electric motor 121 by the battery pack. In an example, the driver circuit 22 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding power elements may be any other types of solid-state switches, such as the IGBTs or the BJTs.

To make the electric motor 121 rotate, the driver circuit 22 has multiple driving states. In one driving state, the stator windings of the electric motor generate a magnetic field, and the controller 23 outputs corresponding pulse-width modulation (PWM) control signals to switching elements in the driver circuit according to a rotor position or a back electromotive force of the electric motor so that the driving state of the driver circuit is switched and thus the stator windings generate a changing magnetic field to drive a rotor to rotate, thereby achieving the rotation or commutation of the electric motor. It is to be noted that any other circuits and control manners that can drive the rotation or commutation of the electric motor can be applied to the present disclosure and the circuit structure of the driver circuit 22 and the control of the driver circuit 22 by the controller 23 are not limited in the present disclosure.

The parameter detection unit 21 can detect at least a working parameter of the electric motor 121 or an electrical parameter of the battery pack 15. In an example, the parameter detection unit 21 may detect an output current, an output voltage, or output power of the electric motor 121, a working time of the electric motor 121 within the nailing cycle (that is, a time of the nailing cycle), a nailing frequency, the number of revolutions of the electric motor within the nailing cycle, or the like. In an example, the parameter detection unit 21 may also detect a battery parameter of the battery pack 15, such as an output voltage, a current, energy consumption, or power consumption of the battery pack within the nailing cycle. It is to be understood that the parameter detection unit 21 may include one or more detection devices that can detect various different working parameters or battery parameters separately or simultaneously.

In this example, if the cylinder 13 has no air leakage or the elastic force of the spring does not degrade, output energy of the electric motor 121 in every nailing cycle is basically the same, or the energy consumption of the battery pack 15 in every nailing cycle is also basically the same. If the cylinder 13 leaks or the elastic force of the spring degrades, the energy required for the electric motor 121 to drive the firing assembly 16 to drive the striking portion 17 to gradually compress the gas or the spring in any nailing cycle is reduced, and the energy consumption of the battery pack 15 is also reduced. That is to say, the output energy of the electric motor 121 and/or the energy consumption of the battery pack 15 within at least one nailing cycle is analyzed so that a sum or integral of the energy of the electric motor or the energy of the battery pack over a time period can be formed, the problem of relatively low reliability in comparing energy or currents or voltages or power at discrete moments can be avoided, and whether the cylinder 13 leaks or whether the elastic force of the spring degrades can be more accurately determined.

In this example, the controller 23 can acquire at least the working parameter of the electric motor 121 and/or the electrical parameter of the battery pack 15 and may determine a magnitude of the output energy of the electric motor 121 within at least one nailing cycle or the energy consumption of the battery pack 15 within at least one nailing cycle according to the acquired parameters. For example, the controller 23 may calculate the output energy of the electric motor within the nailing cycle according to a product of the output current and output voltage of the electric motor 121 within the nailing cycle and the time of the nailing cycle.

It is to be noted that the pressure in the cylinder 13 changes within the nailing cycle as the firing assembly 16 moves within the cylinder 13, but average pressure in the cylinder 13 within the nailing cycle may be considered basically unchanged. If the cylinder 13 leaks, the pressure in the cylinder decreases, that is, the pressure at any moment or the average pressure within the nailing cycle decreases, and then the output energy of the electric motor 121 within the nailing cycle decreases or the energy consumption of the battery pack 15 within the nailing cycle decreases. That is to say, the output energy of the electric motor 121 within the nailing cycle or the energy consumption of the battery pack 15 within the nailing cycle is positively correlated to the pressure in the cylinder 15 or positively correlated to at least the average pressure of the cylinder 13 within the nailing cycle. In an example, the positive correlation may be linear or nonlinear. According to this relationship, the controller 23 may determine the pressure in the cylinder 13 or determine at least a magnitude of the average pressure in the cylinder 13 within the nailing cycle according to the currently calculated output energy of the electric motor 121 and/or energy consumption of the battery pack 15 within at least one nailing cycle. Similarly, when the energy storage device is the spring, the output energy of the electric motor 121 within the nailing cycle or the energy consumption of the battery pack 15 within the nailing cycle is positively correlated to the elastic force of the spring or positively correlated to at least the average elastic force of the spring within the nailing cycle. In an example, the positive correlation may be linear or nonlinear. According to this relationship, the controller 23 may determine the elastic force of the spring or determine at least a magnitude of the elastic force of the spring within the nailing cycle according to the currently calculated output energy of the electric motor 121 and/or energy consumption of the battery pack 15 within at least one nailing cycle. In this example, the pressure in the cylinder 13 or the elastic force of the spring may be understood as the kinetic energy of the energy storage device or may at least correspond to the kinetic energy of the energy storage device.

It is assumed that when the cylinder 13 has no air leakage, the output energy of the electric motor 121 within the nailing cycle is W11 or the energy consumption of the battery pack 15 within the nailing cycle is W21, and the average pressure in the cylinder 13 is Pa1. After the cylinder 13 leaks, the output energy of the electric motor 121 within the nailing cycle is W12 or the energy consumption of the battery pack 15 within the nailing cycle is W22, and the average pressure in the cylinder 13 is Pa2, where W12 is less than W11, W22 is less than W21, and Pa2 is less than Pa1.

In an example, the controller 23 may set the average pressure Pa1 within the nailing cycle when the cylinder 13 has no air leakage as a pressure threshold. When the pressure in the cylinder 13 is determined to be less than the pressure threshold according to the output energy of the electric motor 121 within the nailing cycle and/or the energy consumption of the battery pack 15 within the nailing cycle, it may be determined that the cylinder 13 leaks, and the controller 23 may control the electric motor 121 to stop working, for example, control the electric motor 121 to be powered off or stop outputting the control signals.

In an example, the controller 23 may also control the light-emitting device 18 to display different prompt information when determining a relationship between the pressure in the cylinder 13 and the pressure threshold. For example, when the pressure is lower than the pressure threshold, the cylinder 13 may have the air leakage problem, and the controller 23 may control the light-emitting device 18 to output prompt information in a first manner, where the first manner may include at least one of the number of light-emitting devices, an emitted color, a light emission frequency, a brightness level, or the content displayed through light emission. When the pressure is basically equal to the pressure threshold, the controller 23 may control the light-emitting device 18 to emit no light or to emit light in a second manner different from the first manner. When the pressure is greater than the pressure threshold, the controller 23 may control the light-emitting device 18 to emit light in a light emission manner different from the first manner and the second manner.

Similarly, for the determination of the elastic force of the spring or a warning manner for the elastic force of the spring, reference may be made to the determination of the pressure in the cylinder 13 or the warning manner for the pressure in the cylinder 13, and the details are not repeated here.

Figure 8:
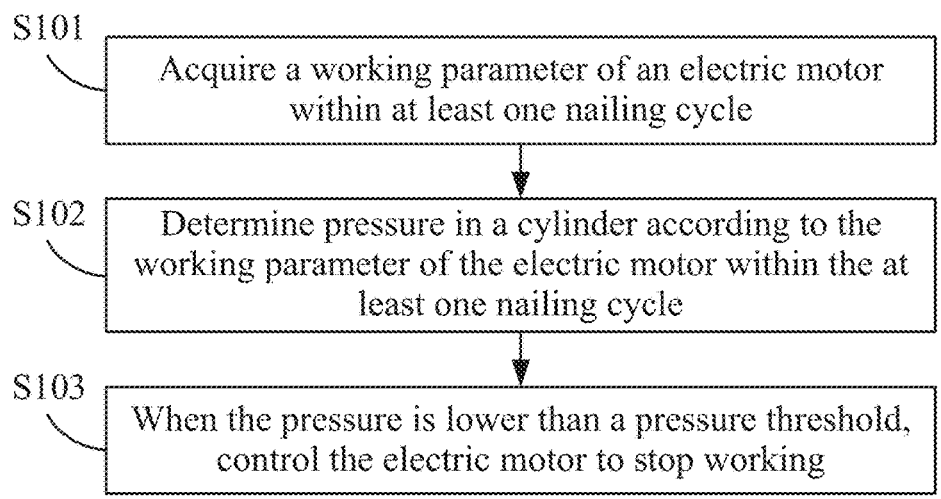
FIG. 8 is a flowchart of a control method of a nail gun according to an example.

As shown in FIG. 8, a control flow of the nail gun may include at least the steps below.

In S101, the working parameter of the electric motor within at least one nailing cycle is acquired.

In S102, the pressure in the cylinder is determined according to the working parameter within the at least one nailing cycle.

In S103, when the pressure is lower than the pressure threshold, the electric motor is controlled to stop working.

Figure 9:
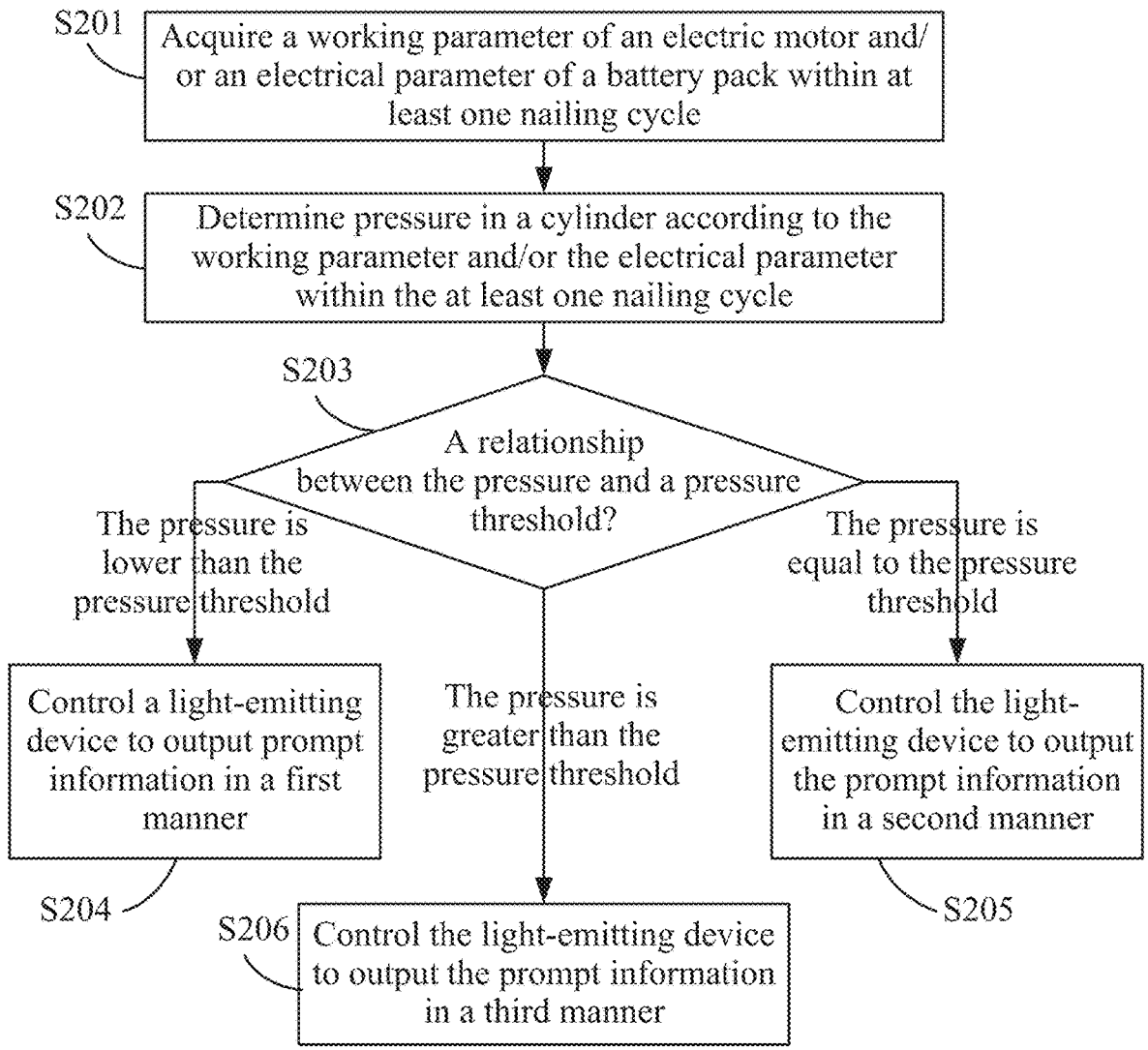
FIG. 9 is a flowchart of a control method of a nail gun according to an example.

As shown in FIG. 9, a control flow of the nail gun may include at least the steps below.

In S201, the working parameter of the electric motor and/or the electrical parameter of the battery pack within at least one nailing cycle are acquired.

In S202, the pressure in the cylinder is determined according to the working parameter and/or the electrical parameter within the at least one nailing cycle.

In S203, the relationship between the pressure in the cylinder and the pressure threshold is determined.

In S204, when the pressure in the cylinder is lower than the pressure threshold, the light-emitting device is controlled to output the prompt information in the first manner.

In S205, when the pressure in the cylinder is basically equal to the pressure threshold, the light-emitting device is controlled to output the prompt information in the second manner.

In S206, when the pressure in the cylinder is greater than the pressure threshold, the light-emitting device is controlled to output the prompt information in a third manner.

As is known, at the end of the nailing cycle of the nail gun, the striker 161 stops at the shutdown position. Generally, the controller 23 may determine whether to shut down according to a working time of the electric motor 121 after power-on. For example, if the nailing cycle is T, the controller 23 may control the electric motor to shut down after the electric motor 121 has rotated for a time T1. However, if a rotational speed of the electric motor is too high, when the electric motor is shut down at a preset shutdown moment, the electric motor may fail to stop rotating completely when the striker 161 has already reached the shutdown position, and thus the striker 161 may be driven to continue moving to the initial position or even perform double strikes.

Since a correspondence between the number of revolutions of the electric motor 121 and a position of the striker 161 is not affected by the rotational speed of the electric motor or other factors, to accurately control the shutdown position of the striker 161, the shutdown position of the striker 161 may be controlled according to the number of revolutions of the electric motor 121 in the present application. In an example, referring to the control circuit shown in FIG. 7, the parameter detection unit 21 may also detect the number of revolutions of the electric motor 121. For example, the parameter detection unit 21 may start counting from 0 after the electric motor is started and calculate the number of revolutions of the electric motor according to the number of commutations of the electric motor. The controller 23 may determine, according to the number of revolutions of the electric motor, a timing to control the electric motor to operate at a constant speed, so as to ensure that the electric motor is operating at a constant rotational speed before the electric motor stops rotating and ensure the accuracy of control of the shutdown position.

Figure 10:
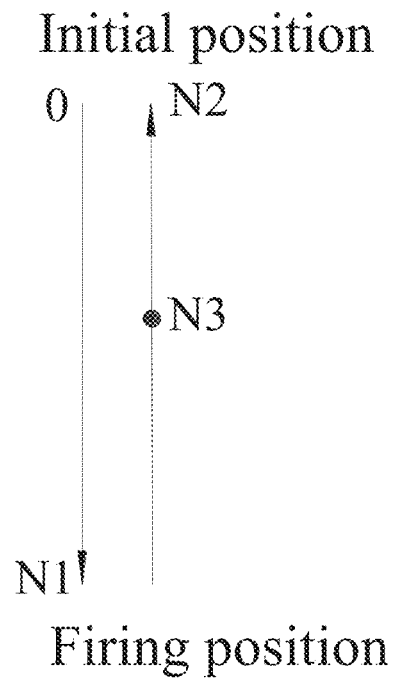
FIG. 10 is a schematic view of movement positions of a striker and numbers of revolutions of an electric motor in a nail gun according to an example.

Referring to FIG. 10, the relationship between the position of the striker 161 and the number of revolutions of the electric motor within the nailing cycle is illustrated by using any physical point of the striker 161 as a reference point. In FIG. 10, the number 0 indicates that the number of revolutions of the electric motor is 0 when the electric motor is just powered on and the striker 161 is at the initial position or the shutdown position, N1 represents the number of revolutions of the electric motor 121 when the electric motor 121 drives the striker 161 to move from the initial position to the firing position, and N2 represents the number of revolutions of the electric motor 121 when the electric motor 121 is powered on and drives the striker 161 to return to the shutdown position after nailing. N3 represents the number of revolutions of the electric motor 121 when a shutdown signal is triggered in the process of the striker 161 returning from the firing position to the initial position. It is to be understood that a Hall sensor may be disposed on the drive wheel 125 to detect the position of the striker 161, and the shutdown signal is triggered when the striker 161 moves to a preset position. In response to the shutdown signal, the controller 23 may control the electric motor 121 to stop rotating.

In this example, when the number of revolutions of the electric motor 121 is greater than or equal to a first revolution number threshold and less than a second revolution number threshold, the controller 23 may control the electric motor 121 to operate at the constant speed. The first revolution number threshold may be the number of revolutions N1 in FIG. 10, and the second revolution number threshold may be the number of revolutions N3 in FIG. 10. That is to say, before detecting the shutdown signal, the controller 23 may control, in advance, the electric motor 121 to operate at the constant speed, so as to ensure that the rotational speed is stable when the electric motor brakes. A stable or constant initial brake speed can ensure that the number of revolutions of the electric motor 121 from the start of braking to the stop of rotation is stable, thereby ensuring that the striker 161 can stably stop at the shutdown position.

In other examples, before detecting the shutdown signal, the controller 23 may control, in other manners, the electric motor 121 to operate at the constant speed until the shutdown signal is detected so that the electric motor can have the stable initial brake speed, ensuring that the striker 161 can stably stop at the shutdown position.

In an example, the controller 23 may control the constant speed of operation of the electric motor 121 according to the energy stored in the energy storage device. Generally, the greater the energy stored in the energy storage device, the higher the constant rotational speed of operation of the electric motor, and vice versa. That is to say, the energy currently stored in the energy storage device is positively correlated to the constant rotational speed of operation of the electric motor.

In this example, the energy storage device is configured to be the cylinder 13. When the number of revolutions of the electric motor 121 is greater than or equal to the first revolution number threshold and less than the second revolution number threshold, the controller 23 may acquire the magnitude of the pressure in the cylinder 13 and set the constant rotational speed of operation of the electric motor according to the magnitude of the pressure, or the controller 23 may calculate the kinetic energy of the cylinder 13 according to the pressure in the cylinder 13 and set the constant speed of operation of the electric motor according to the kinetic energy. In an implementation, the kinetic energy of the cylinder 13 may be kinetic energy at the current moment or average kinetic energy of the cylinder 13 within the nailing cycle. In an implementation, the controller 23 may calculate the pressure in the cylinder 13 in the manner described in the preceding example: the pressure in the cylinder 13 is determined according to the output energy of the electric motor 121 within at least one nailing cycle and/or the energy consumption of the battery pack 15 within at least one nailing cycle. The details are not repeated here.

Figure 11:
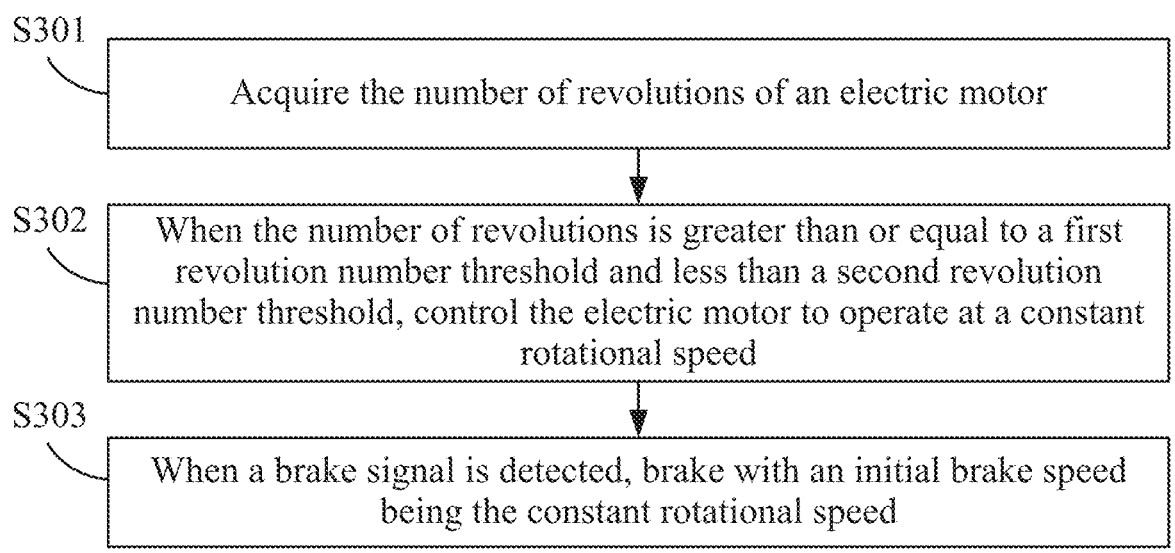
FIG. 11 is a flowchart of a control method of a nail gun according to an example.

As shown in FIG. 11, a control flow of the nail gun may include at least the steps below.

In S301, the number of revolutions of the electric motor is acquired.

In S302, when the number of revolutions is greater than or equal to the first revolution number threshold and less than the second revolution number threshold, the electric motor is controlled to operate at the constant speed.

In S303, when a brake signal is detected, the electric motor brakes with the initial brake speed being the constant rotational speed.

Some power tools require a relatively high startup acceleration to start up, such as the nail gun, a reciprocating saw, and a jigsaw. To quickly start the power tools, a duty cycle of a startup signal needs to be increased to a target value, for example, to the maximum in a short time. However, during the quick startup of the power tools, a relatively large startup current appears. If the power tools start up with a locked rotor or a heavy load, the tools may be burnt. Especially for power tools that need to start and stop frequently, such as the nail gun, an ability to start safely and quickly is an important performance indicator to ensure the normal working of the nail gun.

To avoid the preceding problem, this example provides a control method for startup of a power tool, with the nail gun as an example.

Still referring to the control circuit of the nail gun shown in FIG. 7, the parameter detection unit 21 may detect the working parameter of the electric motor 121 and detect at least the working parameter of the electric motor 121 in the startup process. For example, the parameter detection unit 21 may detect one or more of the rotational speed, the number of revolutions, a startup current, or a startup voltage of the electric motor 121. The controller 23 may set a maximum duty cycle of a control signal for controlling the startup of the electric motor 121 according to the acquired working parameter of the electric motor 121. In this example, a maximum duty cycle of a startup control signal of the electric motor is adjusted according to the working parameter of the electric motor so that when the power tool is forcibly started due to the locked rotor or the heavy load in the startup process, the tool can be prevented from being damaged. The startup process can be understood as a process of the electric motor accelerating from a stationary state to an expected speed after receiving a starting signal.

In the startup process of the electric motor 121, when the controller 23 detects that the working parameter of the electric motor 121 is less than or equal to a parameter threshold, it may be considered that the electric motor 121 may start up with the heavy load or the locked rotor, and consequently, the maximum duty cycle of the startup control signal may be configured to be less than or equal to a duty cycle threshold. It is to be understood that in different types of power tools, different parameter thresholds may be set for the working parameter of the electric motor. For example, the parameter threshold may be a minimum rotational speed or a minimum number of revolutions of the electric motor 121 during startup with the locked rotor or may be a minimum rotational speed or a minimum number of revolutions of the electric motor during startup with the heavy load.

In an example, the controller 23 may set the duty cycle threshold according to the battery parameter of the battery pack 15. For example, the duty cycle threshold may be set according to at least one of battery power, a voltage, a temperature, a cell, and the number of parallel cells of the battery pack. In this example, the duty cycle threshold is inversely correlated to at least one battery parameter. For example, the lower the voltage of the battery pack 15, the greater the duty cycle threshold. For example, the nail gun 100 is generally powered by a 24 V battery pack. If the controller 23 detects that the voltage of the battery pack 15 is lower than 24 V, the duty cycle threshold for the startup control signal is set to 100% so that when the working parameter of the electric motor 121 is less than or equal to the parameter threshold, the duty cycle of the startup control signal can be increased to a maximum of 100%. If the controller 23 detects that the voltage of the battery pack 15 is higher than 24 V, the duty cycle threshold for the startup control signal is set to be lower than 100%, for example, to 60% so that when the working parameter of the electric motor 121 is less than or equal to the parameter threshold, the duty cycle of the startup control signal can be increased to a maximum of 60%. This ensures that when the power tool is mounted with battery packs with different voltages or battery power, the startup performance of the power tool remains basically consistent so that an ability of the machine to resist the locked rotor can be enhanced.

Figure 12:
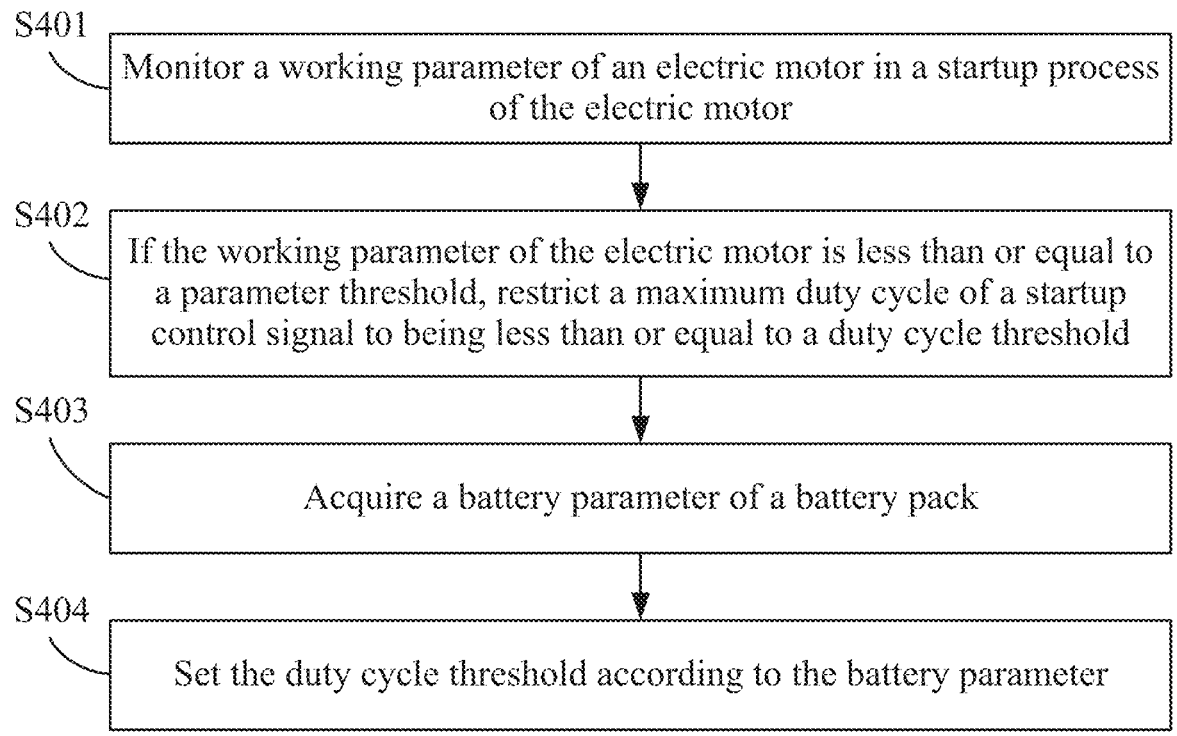
FIG. 12 is a flowchart of a control method of a nail gun according to an example.

As shown in FIG. 12, a control flow of the nail gun may include at least the steps below.

In S401, the working parameter of the electric motor is monitored in the startup process of the electric motor.

In S402, if the working parameter of the electric motor is less than or equal to the parameter threshold, the maximum duty cycle of the startup control signal is restricted to being less than or equal to the duty cycle threshold.

In S403, the battery parameter of the battery pack is acquired.

In S404, the duty cycle threshold is set according to the battery parameter.

The order of some or all flow steps in a flowchart of the present application is not limited to the steps defined in the flowchart, where steps may be performed in parallel or may be interchanged. For example, steps S403 and S404 may be performed in parallel with or interchanged with step S401.

The nail gun 100 generally works in an environment that requires continual and constant nailing. After working for a long time, the temperature of a component such as the cylinder 13 or the electric motor 121 rises excessively, for example, the temperature of the electric motor 121 may reach 150° C. If the nail gun 100 still performs constant and rapid nailing at such a high temperature, some parts inside the nail gun are very likely to be damaged, for example, a circuit board may be burnt or the electric motor is short-circuited. Therefore, the present application provides a nail gun that can detect the temperature and control a startup frequency or startup time interval of the nail gun.

Still referring to the control circuit of the nail gun 100 shown in FIG. 7, the parameter detection unit 21 may include a temperature detection unit capable of detecting temperature data, which can detect the temperature of at least one position in the nail gun 100. In this example, the temperature detection unit may include one or more temperature sensors, such as a thermistor sensor, a thermocouple sensor, a temperature sensor, a platinum resistance temperature sensor, and a digital output sensor.

In an example, the temperature detection unit can detect the temperature of the electric motor 121, such as the temperature of a stator or rotor of the electric motor. Alternatively, the temperature detection unit can detect the temperature of a circuit board where the control circuit is located or the temperature of a power element on the circuit board, the temperature in the cylinder 13 or the temperature of a cylinder wall or the temperature of the striking portion 17, the temperature of the striker 161, the temperature of the piston, or the temperature at an air outlet on the housing 11 of the nail gun 100. The air outlet here may be a heat dissipation opening close to the electric motor 121 or a heat dissipation opening close to the circuit board. In other examples, the temperature detection unit may detect the temperatures of any other positions in the nail gun 100, which are not listed one by one here. The temperature in this example may be understood as the temperature of at least one position or element in the nail gun 100.

In this example, the controller 23 may acquire the temperature detected by the temperature detection unit and adjust a minimum nailing time interval of the nail gun 100 according to a relationship between the temperature and a set temperature threshold. It is to be noted that a time interval between the end of a nailing cycle and the start of the next nailing cycle of the nail gun 100 may be referred to as a nailing time interval, and the minimum nailing time interval may be understood as a minimum time interval between two adjacent nailing cycles. In this example, a starting moment of the nailing cycle may be a time when the controller 23 detects the startup signal, and an ending moment of the nailing cycle may be a time when the controller 23 detects the shutdown signal. Therefore, the nailing time interval may be a time period from when the controller 23 detects the shutdown signal in the former nailing cycle to when the controller 23 detects the startup signal at the beginning of the latter nailing cycle.

Since the nailing frequency may be understood as the number of nailing times in a unit time, the nailing time interval and the nailing frequency are interchangeable in some examples. For example, the controller 23 may adjust the nailing frequency of the nail gun 100 according to the temperature of the nail gun 100.

In an example, when the temperature of at least one position in the nail gun 100 is less than or equal to the temperature threshold, the controller 23 may set the minimum nailing time interval to T1. When the temperature is greater than the temperature threshold, the controller 23 may set the minimum nailing time interval to T2, where T2 is greater than T1. Alternatively, when the temperature of at least one position in the nail gun 100 is less than or equal to the temperature threshold, the controller 23 may set a maximum nailing frequency to f1. When the temperature is greater than the temperature threshold, the controller 23 may set the maximum nailing frequency to f2, where f2 is less than f1. It is to be understood that after the temperature of the nail gun 100 exceeds a predetermined value, the minimum nailing time interval of the nail gun 100 increases, or the nailing frequency of the nail gun decreases. For example, when the temperature of the nail gun is less than or equal to 100° C., the minimum nailing time interval is 1 s, which may be understood as that in the case where the temperature of the nail gun 100 is less than or equal to 100° C., the nailing time interval between any two adjacent nailing cycles is greater than or equal to is. When the temperature of the nail gun is greater than 100° C., the minimum nailing time interval is 2 s, which may be understood as that in the case where the temperature of the nail gun 100 is greater than 100° C., the nailing time interval between any two adjacent nailing cycles is greater than or equal to 2 s.

Figure 13:
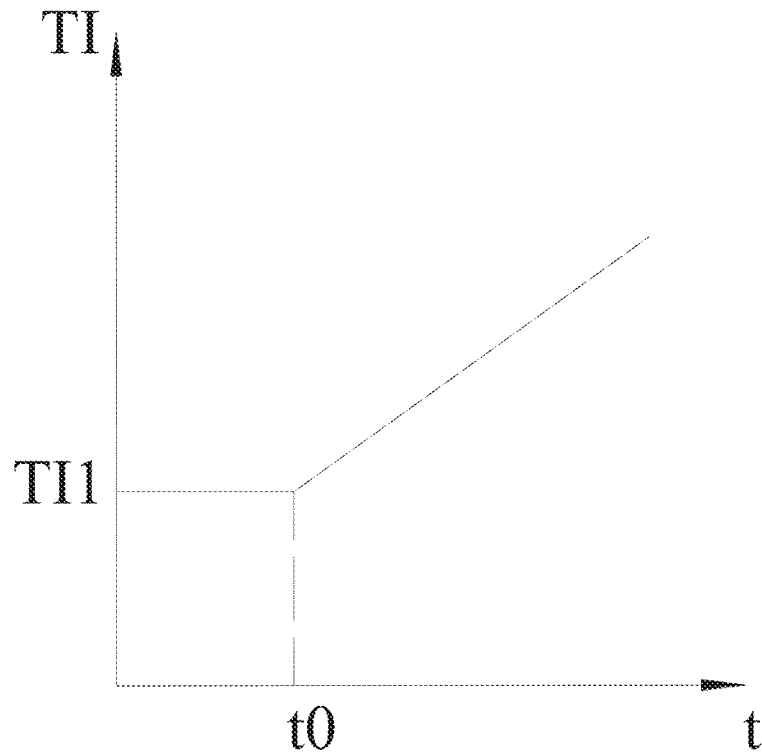
FIG. 13 is a graph showing a relationship between temperature and minimum nailing time interval of a nail gun according to an example.
Figure 14:
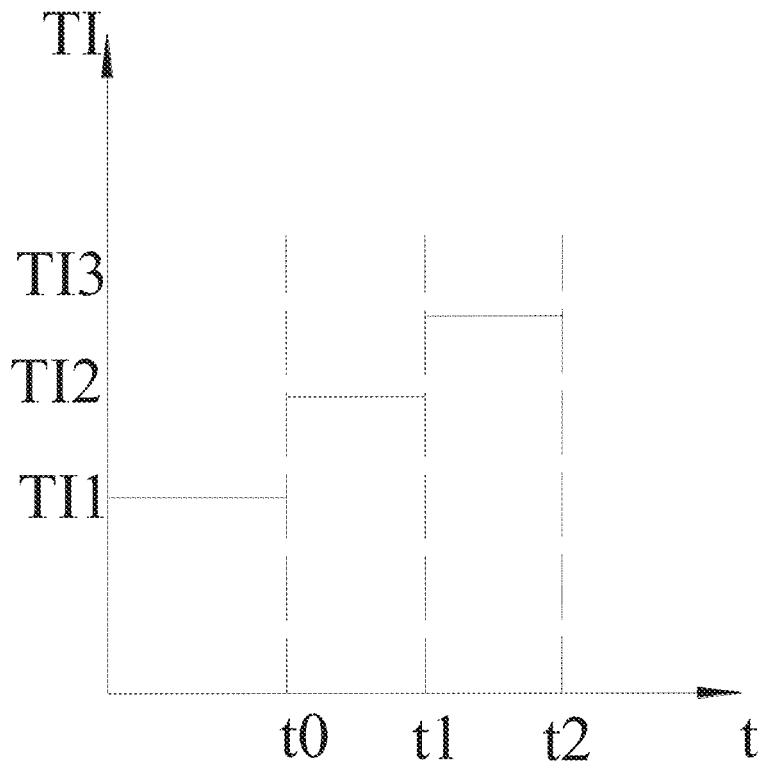
FIG. 14 is a graph showing a relationship between temperature and minimum nailing time interval of a nail gun according to an example.

In an example, the temperature of the nail gun 100 is positively correlated to the minimum nailing time interval. For example, as the temperature of the nail gun rises continuously, the minimum nailing time interval set by the controller 23 increases. In an example, as shown in FIG. 13, the temperature of the nail gun and the minimum nailing time interval have a linear relationship, where the horizontal axis represents the temperature t of the nail gun, and the vertical axis represents the minimum nailing time interval TI. When the temperature of the nail gun is less than a temperature threshold t0, the minimum nailing time interval TI of the nail gun may be a constant value. When the temperature of the nail gun is greater than or equal to the temperature threshold, the higher the temperature t, the greater the minimum nailing time interval TI, which basically have the linear relationship. In an example, as shown in FIG. 14, the temperature of the nail gun and the minimum nailing time interval have a step-like relationship. That is to say, any temperatures within a certain temperature interval correspond to the same minimum nailing time interval. In other examples, the temperature of the nail gun and the minimum nailing time interval may have other relationships. It is to be understood that the temperature of the nail gun may be inversely correlated to the maximum nailing frequency. That is, as the temperature of the nail gun rises continuously, the maximum nailing frequency set by the controller 23 decreases.

In an example, if the controller 23 detects the startup signal and determines that a time between the startup signal and the shutdown signal received last time is less than the minimum nailing time interval, the startup signal may be ignored, that is, the electric motor 121 is not controlled to start, the electric motor 121 is controlled not to start, the electric motor 121 is controlled not to be powered on, or no drive signal is output to drive the electric motor 121. If the controller 23 detects the startup signal and determines that the time between the startup signal and the shutdown signal received last time is greater than or equal to the minimum nailing time interval, the electric motor 121 is controlled to start.

In this example, when the temperature of the nail gun exceeds a certain value, the minimum nailing time interval is prolonged or the nailing frequency is reduced so that the nail gun can have a certain time to cool down or lower the temperature, avoiding continuous working at a high temperature within a short time, improving the safety of the nail gun, and ensuring the working performance of the nail gun.

Figure 15:
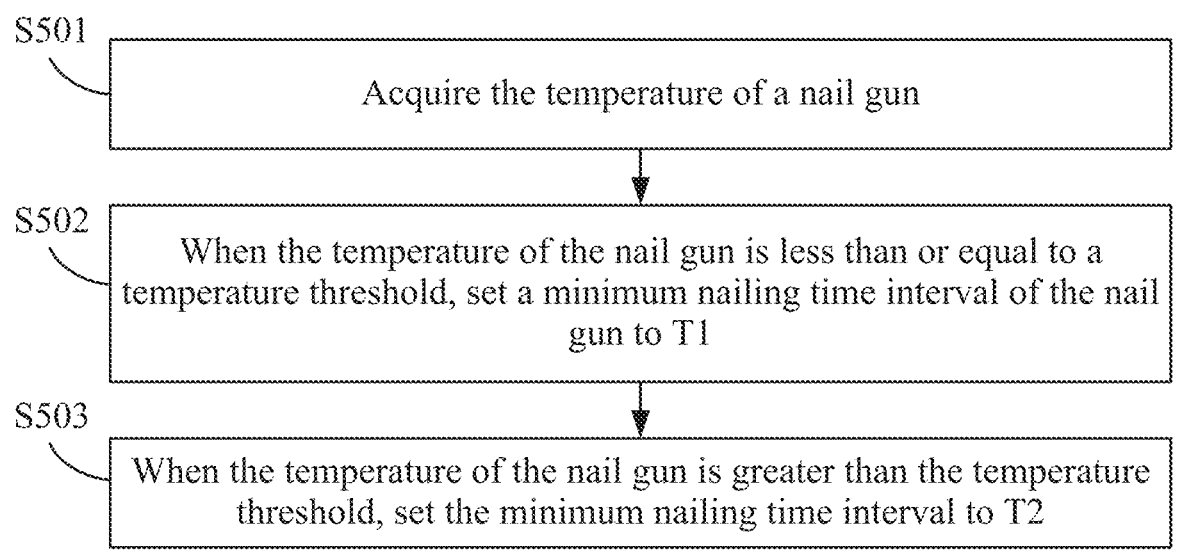
FIG. 15 is a flowchart of a control method of a nail gun according to an example.

As shown in FIG. 15, a control flow of the nail gun may include at least the steps below.

In S501, the temperature of the nail gun is acquired.

In S502, when the temperature of the nail gun is less than or equal to the temperature threshold, the minimum nailing time interval of the nail gun is set to T1.

In S503, when the temperature of the nail gun is greater than the temperature threshold, the minimum nailing time interval is set to T2.

Figure 16:
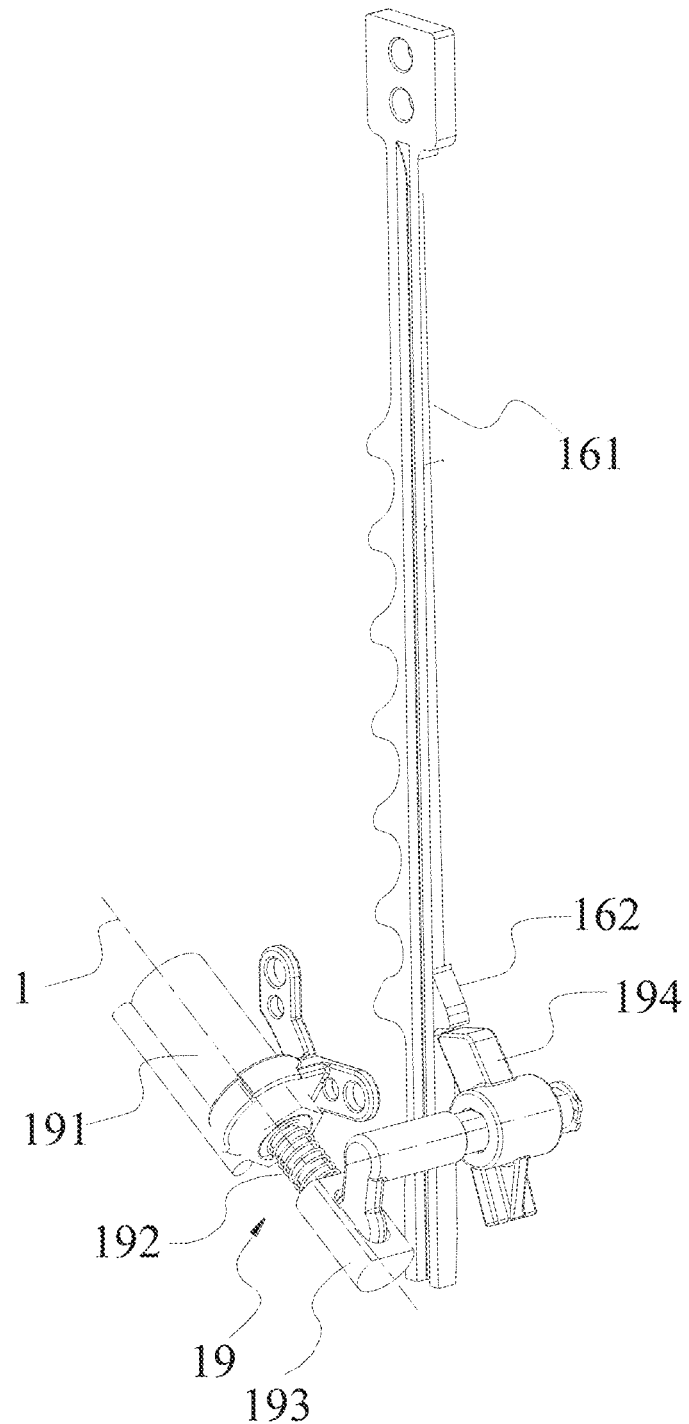
FIG. 16 is a schematic view showing one state of a backstop structure according to an example.
Figure 17:
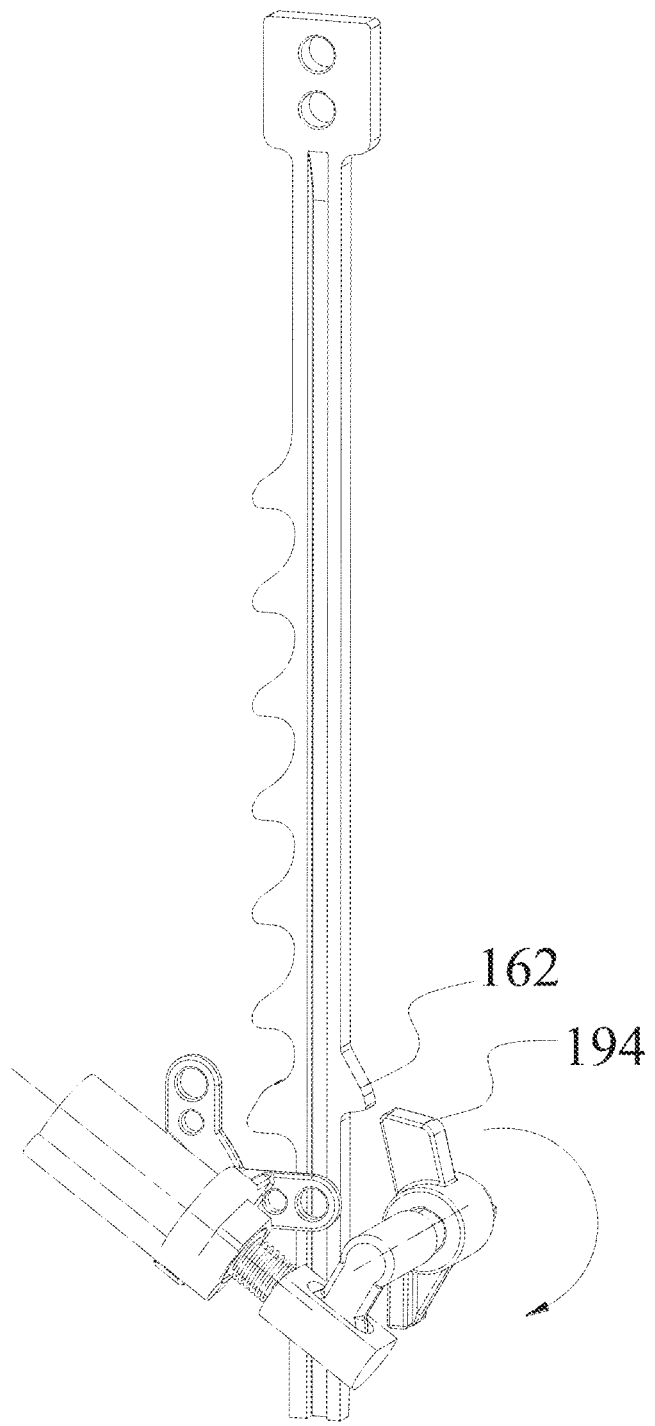
FIG. 17 is a schematic view showing the other state of a backstop structure according to an example.

In an example, to prevent the striker 161 from slipping down in the process of the striker 161 moving from the firing position to the initial position or after the nail gun 100 shuts down, a backstop structure 19 may be used for stopping or locking the striker, as shown in FIGS. 16 and 17.

Still referring to FIGS. 16 and 17, the backstop structure 19 may include a solenoid 191, an elastic element 192, a push rod 193, and a stop portion 194. The solenoid 191 can be electrically connected to at least the controller 23, and the controller 23 can control the solenoid 191 to be energized or de-energized. As shown in FIG. 16, when the solenoid 191 is in a de-energized state, the elastic element 192 is in an extended state, and the stop portion 194 connected to the push rod 193 is engaged with a backstop tooth 162 on the other side of the striker 161, enabling the striker 161 to remain at the initial position and not slip down. After the nail gun is started and the electric motor 121 is powered on, the solenoid 191 is energized, generates an electromagnetic effect, and attracts the push rod 193 to compress along a first direction 1 so that the stop portion 194 can rotate clockwise and be disengaged from the backstop tooth 162. Without being stopped, the striker 161 can be driven by the power in the cylinder 13 to drive the nail.

That is to say, the energized solenoid 191 can make the stop portion 194 in a failure state, that is, the stop portion 194 cannot lock the striker 161 or is not in contact with the striker 161 so that the striker 161 can be driven by the drive wheel 125 to move from the initial position to the firing position to drive the nail. When the solenoid 191 is de-energized, the stop portion 194 is in a stop state, that is, the stop portion 194 can lock the striker 161 at the initial position or at least prevent the striker 161 from slipping down in the process of the striker 161 moving from the firing position to the initial position.

If the solenoid 191 cannot be activated in time to make the stop portion 194 in the stop state when the striker 161 moves to the initial position after nailing, the striker 161 may slip accidentally, resulting in continual strikes or other safety accidents.

To solve the preceding problem, still referring to the control circuit diagram of the nail gun shown in FIG. 7, the parameter detection unit 21 can detect the number of revolutions of the electric motor 121. When the electric motor 121 is started, the controller 23 controls the solenoid 191 to be energized so that the stop portion 194 works in the failure state, and the striker 161 can move from the initial position to the firing position. After the electric motor 121 is powered on, the controller 23 may continuously monitor the number of revolutions of the electric motor 121 and controls the solenoid 191 to be de-energized when the number of revolutions is greater than or equal to a revolution number threshold so that the stop portion 194 works in the stop state and can prevent the striker 161 from slipping during its upward movement to return to the initial position and can lock the striker 161 at the initial position. That is to say, after the nail gun 100 shuts down, the solenoid 191 remains in the de-energized state. Even if the nail gun 100 is not in operation for a long time, the backstop structure 19 does not need to keep the solenoid 191 in an energized state to lock the striker 161 so that the solenoid can be prevented from working for a long time and having a relatively high temperature. The revolution number threshold in this example may be the number of revolutions of the electric motor 121 when the striker 161 reaches the firing position after the electric motor 121 is started. Since a displacement of the striker 161 is determined when the electric motor 121 rotates a certain number of revolutions, the solenoid is controlled to be de-energized according to the number of revolutions of the electric motor, ensuring that the striker can be locked by the solenoid and the solenoid can be prevented from being energized for a long time and generating heat.

It is to be understood that in the process of the striker 161 moving downward from the initial position to the firing position, the striker 161 relies on the power stored in the energy storage device, that is, the cylinder 13, to rapidly complete nailing. In this process, the drive wheel 125 does not mesh with the striker 161, and the electric motor 121 drives the drive wheel 125 to rotate. However, in the process of the striker 161 moving upward from the firing position after nailing, the drive wheel 125 meshes with the striker 161, the striker 161 moves upward under the drive of the drive wheel 125, and the electric motor 121 changes from not driving the striker 161 to driving the striker 161. A working state of electric motor 121 changes and therefore the working parameter of the electric motor 121 has a relatively large change. For example, when the striker 161 starts to move upward from the firing position, a working current or output torque or the rotational speed of the electric motor 121 changes to a relatively large degree, where an output current of the electric motor increases, the output torque of the electric motor increases, or the rotational speed of the electric motor decreases.

In this example, the controller 23 may also monitor at least one of the output current, output torque, or rotational speed of the electric motor to determine whether the striker 161 starts to move upward from the firing position. For example, when monitoring that the output current of the electric motor or a rate of change of the output current is greater than a set threshold, the controller 23 may control the solenoid 191 to be de-energized so that the stop portion 194 works in the stop state. Alternatively, when detecting that the output torque of the electric motor or a rate of change of the torque is greater than a set threshold, the controller 23 may control the solenoid 191 to be de-energized so that the stop portion 194 works in the stop state. Alternatively, when detecting that the rotational speed or acceleration of the electric motor is greater than a set threshold, the controller 23 may control the solenoid 191 to be de-energized so that the stop portion 194 works in the stop state.

Figure 18:
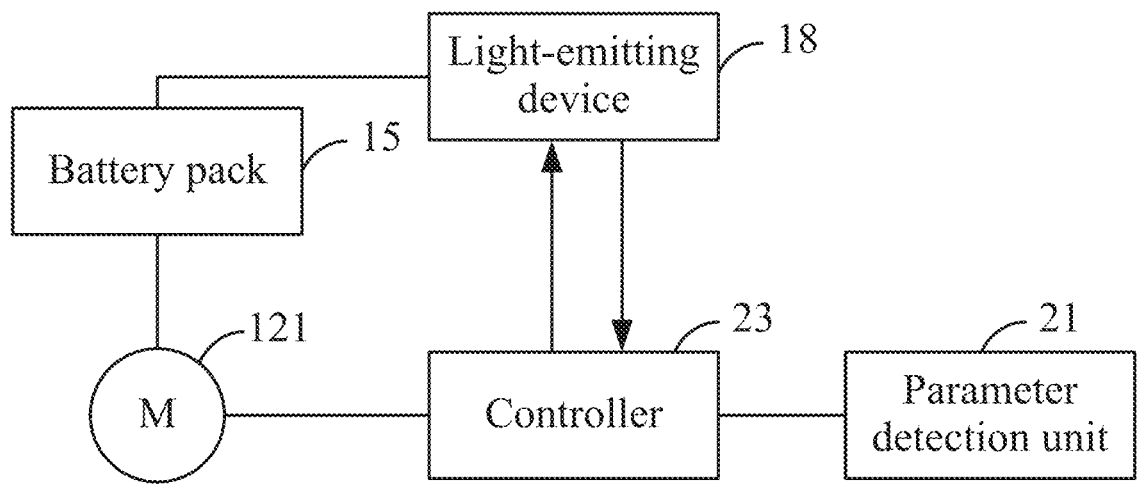
FIG. 18 is a control circuit diagram of a light-emitting device according to an example.

Referring to a control circuit of the light-emitting device shown in FIG. 18, some units or devices are consistent with those in FIG. 7 and use the same reference numerals as those in FIG. 7. The parameter detection unit 21 may include a sensor that can detect a total number of nails in the magazine assembly 14 or the number of the remaining nails, a sensor that can detect the depth of the driven nail, or a sensor that can detect the nailing strength. Types, mounting positions, or working manners of various sensors are not specifically limited in this example.

The controller 23 may acquire information transmitted by the parameter detection unit 21 and control the light-emitting device 18 to display first information about the nails in the magazine assembly 14 and/or second information about the driven nail. In an example, the first information may include the specific number of the remaining nails in the magazine assembly 14, a number range of the remaining nails, or alarm information when the number of the remaining nails is less than a preset number. The second information may include the nailing depth, the nailing strength, or a nailing angle of the driven nail or a nailing interval between driven nails.

Figure 19:
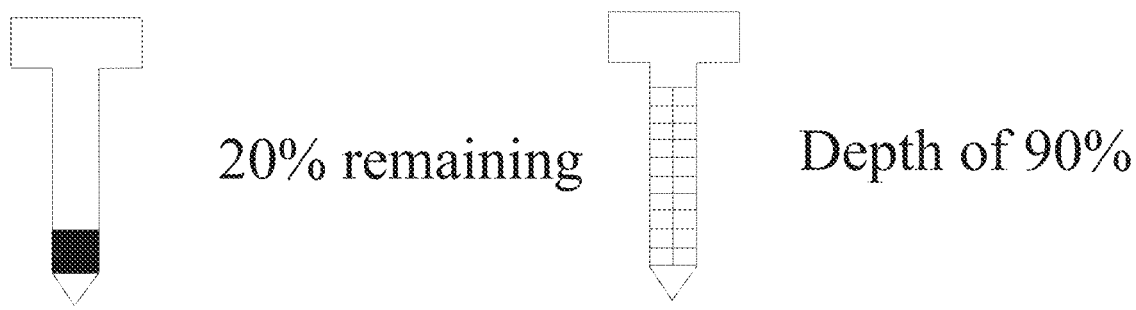
FIG. 19 is a schematic showing display of a light-emitting device according to an example.

In this example, the light-emitting device 18 shown in FIGS. 1 and 6 includes LED Nixie tubes 181 and 182 or at least one light strip composed of multiple LEDs and may also include a display screen 183 shown in FIG. 6. The Nixie tube may display the first information and/or the second information in one or more manners such as a light intensity, a flashing frequency, the number of flashes, the emitted color, and the number of lights. The display screen 183 may directly display content data. For example, as shown in FIG. 19, the light-emitting device 18 may display a graphic of the nail and the number of nails or the number of the remaining nails, display an image or the depth of the nail driven actually, or display a nailing animation. The light-emitting device is not limited to the Nixie tube or the display screen, and any light-emitting device that can display the preceding information is within the scope of the present application.

In an example, the controller 23 may also display fault information or a current working mode of the nail gun 100 or information about the battery pack. The fault information may include various common faults, such as overtemperature, overvoltage, undervoltage, overcurrent, the locked rotor, and anti-lock. The working mode may include a single strike mode (that is, a single drive mode) and a continual strike mode (that is, a continual drive mode). Battery information may include the remaining battery power, remaining battery time, output voltage, output current, or temperature of the battery pack. In this example, the light-emitting device 18 may also display the fault information, the working mode, or the information about the battery pack in at least one manner of the light intensity, the flashing frequency, the number of flashes, the emitted color, the light emission number, or content data display.

In an example, the light-emitting device 18 may display different fault codes to represent different fault information, for example, E1 represents overtemperature of a power tube in the control circuit, E2 represents the locked rotor of the electric motor, and E3 represents battery undervoltage. Faults are displayed through different fault codes so that different fault types of the nail gun are not affected by the number of light-emitting devices 18, the emitted color, or the light emission frequency, and more intelligent and simpler fault display is implemented.

In an example, the display screen 183, as the light-emitting device, may include an operation interface, which may be, for example, a touch interface or an interface that can be combined with physical buttons. The operation interface can receive operation information from the user and may transmit the operation information to the controller 23 while displaying the operation information. The controller 23 may control, according to an operation of the user, the electric motor 121 to work. For example, the user may select a nailing mode, switch the nailing mode, or set an operating parameter of the nail gun on the operation interface, for example, set the nailing strength, nailing depth, nailing time interval, or nailing frequency.

In an example, the light-emitting device 18 may be divided into a lighting device and a fault prompt device. In some examples, the lighting device and the fault prompt device may be the same device or different devices. If the lighting device and the fault prompt device are the same light-emitting device, when the nail gun 100 has no fault, the light-emitting device 18 remains in an always on state. When the nail gun 100 has a fault, the fault may be prompted in a manner such as the flashing frequency, the color, the number of flashes, or a fault code, or the light-emitting device may be off to prompt the fault. If the lighting device and the fault prompt device are different light-emitting devices, when the nail gun 100 has no fault, the lighting device may remain in the always on state, and the fault prompt device may remain in an always off state. When the fault occurs, the lighting device may remain always on or be off, and the fault prompt device may prompt the fault in the preceding fault prompt manner. If the lighting device and the fault prompt device are different light-emitting devices, when the nail gun 100 has no fault, the lighting device and the fault prompt device may both remain in the always on state. When the fault occurs, the lighting device may remain always on or be off, and the fault prompt device may be off to prompt the fault or prompt the fault in the preceding fault prompt manner. In an example, when or after prompting a fault type, the fault prompt device may prompt a fault level through the emitted color and/or the flashing frequency. For example, in response to no fault, a green light is always on; in response to a minor fault (such as undervoltage protection or overtemperature protection), a yellow light is on or flashing; and in response to a serious fault (such as overcurrent protection, locked-rotor protection, or anti-lock protection), a red light is on or flashing.

In an example, the parameter detection unit 21 may be a brightness sensor or another sensor that can detect an illumination intensity of a working environment of the nail gun. The controller 23 may control, according to the detected illumination intensity, whether the light-emitting device 18 is turned on or control the light intensity. For example, during working outdoors in daytime with good weather, the light-emitting device 18 may be controlled to be off, or at least the lighting device may be controlled to be off. During working in a dim indoor environment, the brightness of the light-emitting device may be increased, or at least the brightness of the lighting device may be increased.

Figure 20:
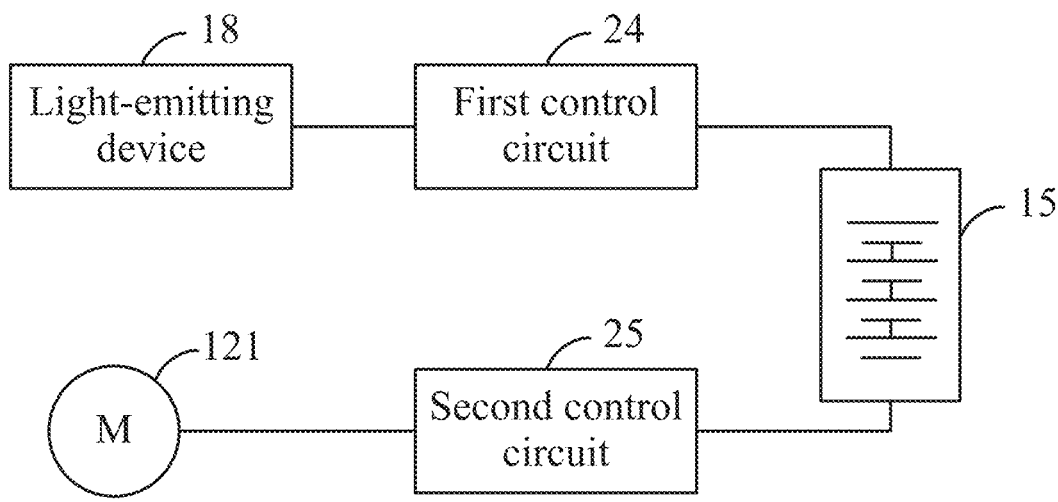
FIG. 20 is a circuit schematic of a nail gun according to an example.

Referring to a control circuit of the nail gun shown in FIG. 20, the control circuit includes some structures or parts the same as those in the control circuit in FIG. 7, and the circuit in FIG. 20 uses the same reference numerals as that in FIG. 7. The control circuit includes at least a first control circuit 24 capable of controlling the light-emitting device 18 and a second control circuit 25 for controlling the electric motor 121. When the electric motor 121 is not powered on, the first control circuit 24 can at least independently control the light-emitting device 18 to be on. That is, in the case where the electric motor 121 is not started, the first control circuit 24 controls, in advance, the light-emitting device 18 to be on. When the light-emitting device 18 is turned on before nailing, the workpiece or the working environment can be illuminated in advance so that the user obtains better user experience. Even if the electric motor 121 fails to start, the lighting device 18 can work.

In an example, the first control circuit 24 and the second control circuit 25 may be disposed on the same circuit board. In an example, the first control circuit 24 and the second control circuit 25 may be disposed on different circuit boards.

Figure 21:
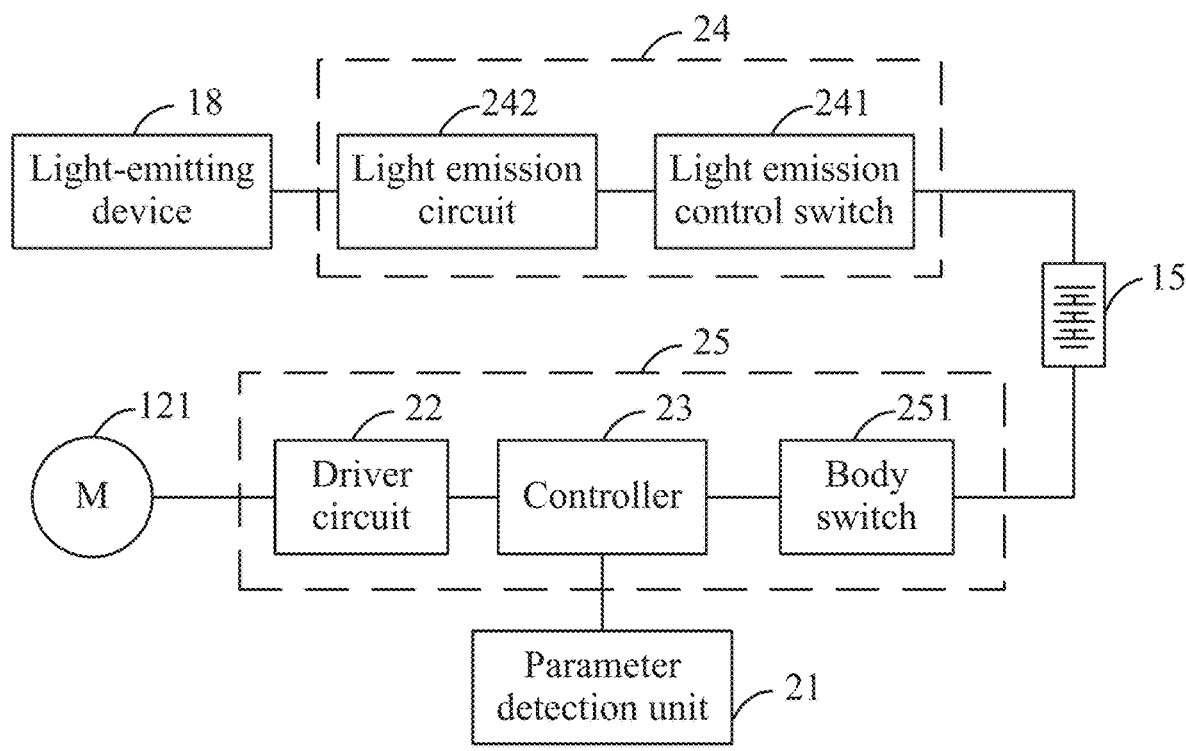
FIG. 21 is a circuit schematic of a nail gun according to an example.

Referring to a control circuit of the nail gun shown in FIG. 21, the first control circuit 24 includes at least a light emission control switch 241 and a light emission circuit 242. After being operated by the user, the light emission control switch 241 can conduct a current path between the light emission circuit 242 and the battery pack 15 so that the light-emitting device 18 can be turned on. In this example, the light emission control switch 241 may be a button switch, a toggle switch, a membrane switch, a lever switch, a microswitch, a travel switch, or the like. The second control circuit 25 is basically consistent with the control circuit in FIG. 7, is a circuit for controlling the operation or shutdown of the electric motor 121, and may also be referred to as a main control circuit of the nail gun 100. In this example, the second control circuit 25 may include a body switch 251, the driver circuit 22, and the controller 23. After being operated by the user, the body switch 251 can conduct a current path between the controller 23, the driver circuit 22, and the electric motor 121. After outputting the control signals, the controller 23 can control the operation of the electric motor 121. For implementations where the controller 23 controls the operation of the electric motor 121, reference may be made to the description of the control circuit shown in FIG. 7, and the details are not repeated here. It is to be noted that the body switch 251 may be the button switch, the toggle switch, the membrane switch, the lever switch, the microswitch, the travel switch, or the like.

In other examples, it may be considered that the light emission control switch 241 does not belong to the first control circuit 24 but is connected to the first control circuit 24. Alternatively, it is considered that the body switch 251 does not belong to the second control circuit 25 but is connected to the second control circuit 25. That is to say, the control circuit may be divided in other manners, which can be accepted as long as the corresponding functions can be implemented.

In an example, the nail gun 100 may include one travel switch (not shown). The travel switch functions as the light emission control switch 241 in response to a first switch travel and functions as the body switch 251 in response to a second switch travel. In an example, when the travel switch has the second switch travel, the controller 23 in the second control circuit 25 is conductive, while the electric motor 121 is not started. When the travel switch is operated to a third switch travel, the electric motor 121 is started. In an example, when the travel switch is operated to a fourth switch travel, the controller 23 may perform a particular control operation on the electric motor 121, for example, the controller 23 can control the electric motor 121 to operate at the constant speed.

In an example, the light emission control switch 241 may be operated to control the light-emitting device 18 to be turned off. Alternatively, the controller 23 in the second control circuit 25 may control the light emission circuit 242 to be powered off to turn off the light-emitting device 18. In an example, the controller 23 may control the light emission circuit 242 to be disconnected with a delay so that the light-emitting device 18 is turned off with a delay. It is to be understood that the function of the light emission circuit 242 may be implemented by different elements, and the specific circuit structure of the light emission circuit is not limited in the present application.

Still referring to FIG. 21, the controller 23 may control, according to the working parameter of the electric motor 121 and/or the battery parameter of the battery pack 15 detected by the parameter detection unit 21, the light emission circuit 242 to change a circuit state so that the light-emitting device 18 can a light emission form to issue an alarm prompt. The working parameter of the electric motor 121 may be the output current, output voltage, or output power of the electric motor 121, the working time of the electric motor 121 within the nailing cycle (that is, the time of the nailing cycle), the nailing frequency, the number of revolutions of the electric motor within the nailing cycle, the temperature of the electric motor, or the like. The battery parameter may be the output voltage, current, energy consumption, or power consumption of the battery pack 15 within the nailing cycle, the temperature of the battery pack 15, or the like. For example, when determining the locked rotor of the electric motor according to the current of the electric motor 121, the controller 23 may control the electric motor 121 to stop rotating and control the light emission circuit 242 to change the circuit state so that the light-emitting device 18 flashes and/or emits red light as an alarm prompt. In this example, the controller 23 may control the light-emitting device 18 to issue the alarm prompt in at least one form of the number of light-emitting devices, the emitted color, the light emission frequency, the number of flashes, the brightness level, or the content displayed through light emission. The controller 23 may also set an alarm according to a fault type or a fault level.

Still referring to FIGS. 1 and 2, the nail gun 100 includes a push rod switch 113b in addition to a trigger switch 113a. The trigger switch 113a is configured to control the start and stop of the nail gun 100. The push rod switch 113b may serve as a safety switch and be disposed at the lower end of the firing assembly 16. When the user pushes the nail gun 100 downward along the nailing direction, that is, the direction of the second straight line 102, the push rod switch 113b can abut against the workpiece so that the push rod switch 113b is turned on, that is, the push rod switch 113b is triggered. In this example, the nail gun 100 is further provided with a guide assembly 114, where the guide assembly 114 may be formed by the housing 11 or disposed on the housing 11 and can partially or fully cover the firing assembly 16 and at least guide the firing assembly 16 to perform nailing in the nailing direction. It is to be understood that the lower end of the guide assembly 114 may be an exit of the nail. A height difference exists between the lower end of the push rod switch 113b and the lower end of the guide assembly 114. When the push rod switch 113b is just in contact with the workpiece, the distance between the lower end of the guide assembly 114 and the workpiece is the height difference.

Generally, the nail gun 100 can include at least two working modes: a single drive mode and a continual drive mode. In the single drive mode, one nail can be driven each time. In the continual drive mode, nails are driven continually multiple times. In an example, the trigger switch 113a and the push rod switch 113b are triggered in different manners corresponding to different working modes of the nail gun 100. For example, in the case where the push rod switch 113b abuts against the workpiece, the trigger switch 113a is operated so that the single drive mode of the nail gun 100 can be enabled to drive one nail. When the trigger switch 113a is operated and the push rod switch 113b abuts against the workpiece, the continual drive mode of the nail gun 100 can be enabled. In the continual drive mode, the trigger switch 113a is continuously operated, and the user only needs to intermittently press the push rod switch 113b against the workpiece so that the nails can be driven continually. That is to say, in the case where the trigger switch 113a is always triggered by the user, one nail is driven every time the push rod switch 113b abuts against the workpiece. That is to say, continual nailing does not mean continuous nailing but that in the case where the trigger switch 113a is continuously triggered by the user, one nail is driven every time the push rod switch 113b is turned on. Generally, when a relatively heavy workload is required or when the workpiece has good continuity or planarity and needs to be fastened at multiple positions, the user may perform the continual nailing in the continual drive mode to improve the working efficiency.

However, some drawbacks exist in the continual drive mode. For example, to further improve the nailing efficiency, in the case where the trigger switch 113a is operated, the nail is driven when the push rod switch 113b abuts against the workpiece, that is, is triggered to turn on. Generally, when the push rod switch 113b abuts against the workpiece to be turned on, there is still a certain distance between the lower end of the guide assembly 114 and a surface of the workpiece, affecting the nailing quality and the nailing effect. For example, some driven nails are exposed out of the workpiece.

To solve this problem, in the continual drive mode, the controller 23 may at least control a nailing timing of the nail gun 100 according to the distance from the lower end of the guide assembly 114 to the surface of the workpiece. The nailing timing may be understood as an objective nailing moment. Alternatively, the controller 23 may control the nailing timing according to the distance between another relatively fixed position of the nail gun 100 and the surface of the workpiece. Still referring to FIG. 7, the parameter detection unit 21 may detect the distance from the lower end of the guide assembly 114 to the surface of the workpiece. In this example, the parameter detection unit 21 may be a distance sensor, and the distance sensor may be disposed at the lower end (not shown) of the guide assembly 114 or at another fixed position of the nail gun 100, which is not limited here. In some examples, the distance sensor may be a laser sensor, an ultrasonic sensor, an infrared sensor, or the like.

In the continual drive mode, when detecting that the distance from the lower end of the guide assembly 114 to the surface of the workpiece is less than or equal to a preset distance, the controller 23 may control the electric motor 121 to operate so that the firing assembly 16 can be released from the initial position to drive the nail. The preset distance may be any distance greater than or equal to 0. That is to say, nailing is triggered when the lower end of the guide assembly 114 is in contact with the surface of the workpiece or when the lower end of the guide assembly 114 is very close to the surface of the workpiece. The effect of the nailing when the nail is relatively far from the surface of the workpiece on the nailing quality and the nailing effect is avoided. When detecting that the distance from the lower end of the guide assembly 114 to the surface of the workpiece is greater than the preset distance, the controller 23 does not start at least the nailing until the detected distance is less than or equal to the preset distance. It may also be understood as that when the distance from the lower end of the guide assembly 114 to the surface of the workpiece is detected to be greater than the preset distance, a time it takes to start the nailing is extended.

In an example, not starting the nailing may include reducing a startup speed. For example, the electric motor 121 may be controlled to reduce the rotational speed to reduce a speed at which the nailing is started so that a relatively long time is obtained to operate the push rod switch 113b to continuously depress. Thus, the guide assembly 114 can be closer to the surface of the workpiece in the case where the user continuously depresses the push rod switch 113b so that the nail gun 100 can have a shorter nailing distance in the continual drive mode.

In an example, the control circuit of the nail gun 100 shown in FIG. 7 may include at least one filter element. For example, the power elements VT1 to VT6 in the driver circuit 22 may serve as filter elements, or a filter capacitor may be provided in the control circuit. A position of the filter element in the control circuit and a type of the filter element are not limited in this example, and any element with the filtering function in the control circuit is within the scope of the present application. In this example, not starting the nailing may include extending a filtering time of the filter element in the control circuit. For example, the filter element is controlled to perform filtering at least two times. The filtering time of the control circuit is extended so that a relatively long time can be obtained to operate the push rod switch 113b to continuously depress. Thus, the guide assembly 114 can be closer to the surface of the workpiece in the case where the user continuously depresses the push rod switch 113b so that the nail gun 100 can have the shorter nailing distance in the continual drive mode.

It is to be understood that the controller 23 may adopt other manners to extend the time it takes to start the nailing. That is to say, other solutions or concepts for reducing the distance from the guide assembly 114 to the surface of the workpiece by extending the time it takes to start the nailing in the continual drive mode to achieve the better nailing quality and effect are within the scope of the present application.

It is assumed that in the continual drive mode, a time from when the push rod switch 113b starts to abut against the surface of the workpiece to when the firing assembly 16 drives the nail is a nailing response time. In this example, the nailing response time is greater than or equal to a time from when the trigger switch 113a is operated to when the firing assembly 16 drives the nail in the single drive mode. Without a significant increase in the nailing response time, the better nailing effect and quality are achieved.

Figure 22:
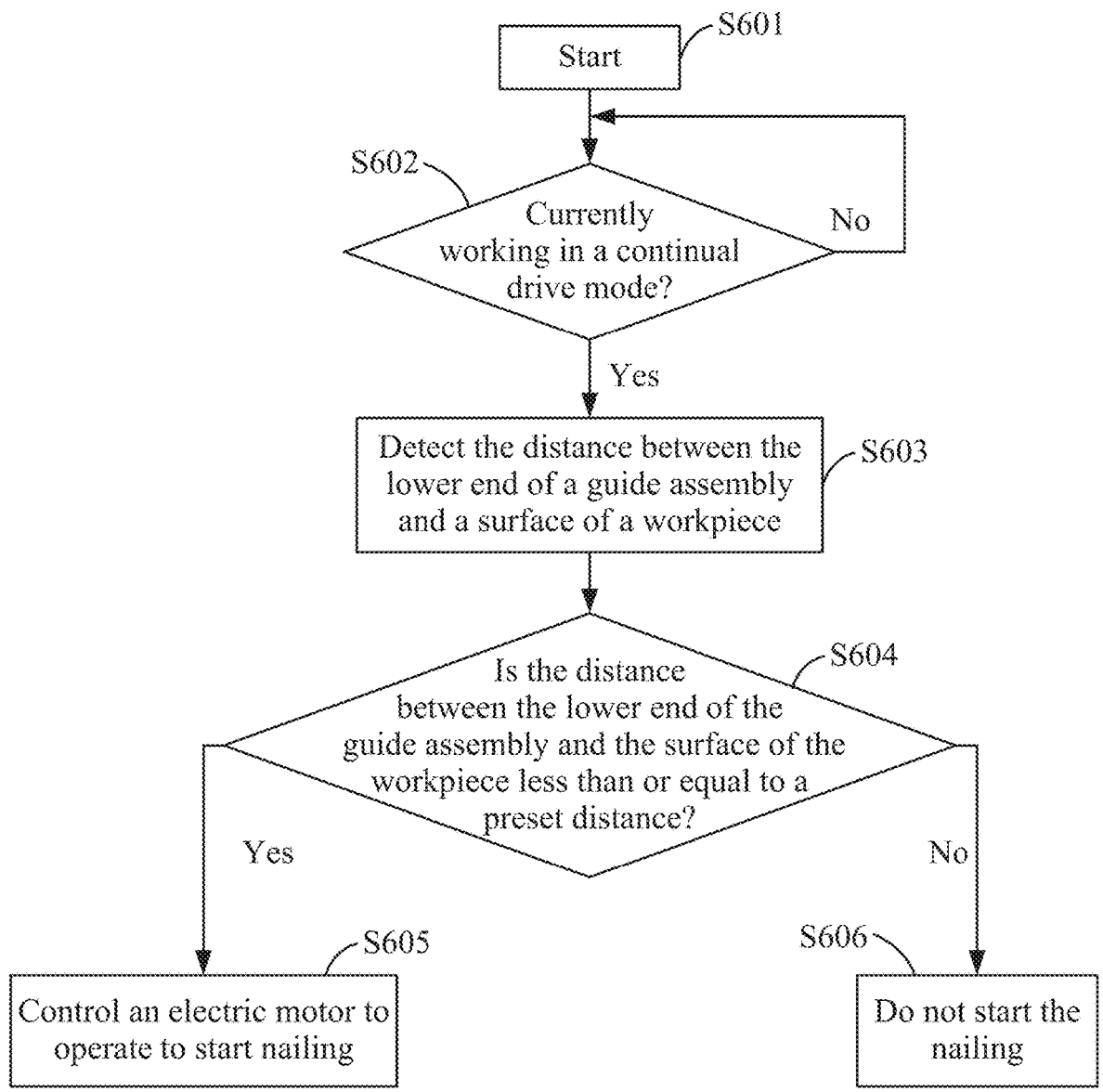
FIG. 22 is a flowchart of a control method of a nail gun according to an example.

As shown in FIG. 22, a control flow of the nail gun includes at least the steps below.

In S601, the control flow starts.

In S602, it is determined whether the nail gun is currently working in the continual drive mode. If so, step S603 is performed; otherwise, the working mode of the nail gun continues to be monitored.

In S603, the distance between the lower end of the guide assembly and the surface of the workpiece is detected.

In S604, it is determined whether the distance is less than or equal to the preset distance.

If so, step S605 is performed; otherwise, step S606 is performed.

In S605, the electric motor is controlled to operate to start the nailing.

In S606, the nailing is not started.

The basic principles, main features, and advantages of the present application are shown and described above. It is to be understood by those skilled in the art that the preceding examples do not limit the present application in any form, and any technical solutions obtained through equivalent substitutions or equivalent transformations are within the scope of the present application.

What is claimed is:

1. A nail gun, comprising:
   a housing;
   an electric motor disposed in the housing;
   a battery pack to power the electric motor;
   a firing assembly movable from an initial position to a firing position to drive a nail into a workpiece and movable from the firing position to the initial position within a nailing cycle;
   a parameter detection unit connected to the electric motor to detect a working parameter of the electric motor; and
   a controller connected to the parameter detection unit, the controller restricting a maximum duty cycle of a startup control signal to being less than or equal to a duty cycle threshold when the working parameter of the electric motor in a startup process is less than or equal to a parameter threshold.

2. The nail gun of claim 1, wherein the controller sets the duty cycle threshold according to a battery parameter of the battery pack.

3. The nail gun of claim 1, wherein the working parameter of the electric motor comprises at least one of a rotational speed, a number of revolutions, a startup current, or a startup voltage of the electric motor.

4. The nail gun of claim 2, wherein the battery parameter of the battery pack comprises at least one of an electric power, a voltage, a temperature, a cell, or a number of parallel cells.

5. The nail gun of claim 2, wherein the duty cycle threshold is inversely correlated to at least one battery parameter.

6. The nail gun of claim 1, wherein the parameter threshold comprises a minimum rotational speed of the electric motor during startup with a locked rotor.

7. The nail gun of claim 1, wherein the parameter threshold comprises a minimum number of revolutions of the electric motor during startup with a locked rotor.

8. The nail gun of claim 1, wherein the parameter threshold comprises a minimum rotational speed of the electric motor during startup with a heavy load.

9. The nail gun of claim 1, wherein the parameter threshold comprises a minimum number of revolutions of the electric motor during startup with a heavy load.

10. A power tool, comprising:
a housing;
an electric motor disposed in the housing;
a battery pack to power the electric motor;
a parameter detection unit connected to the electric motor to detect a working parameter of the electric motor; and
a controller connected to the parameter detection unit to restrict a maximum duty cycle of a startup control signal to being less than or equal to a duty cycle threshold when the working parameter of the electric motor in a startup process is less than or equal to a parameter threshold.

11. The power tool of claim 10, wherein the controller sets the duty cycle threshold according to a battery parameter of the battery pack.

12. The power tool of claim 10, wherein the working parameter of the electric motor comprises at least one of a rotational speed, a number of revolutions, a startup current, or a startup voltage of the electric motor.

13. The power tool of claim 11, wherein the battery parameter of the battery pack comprises at least one of an electric power, a voltage, a temperature, a cell, or a number of parallel cells.

14. The power tool of claim 11, wherein the duty cycle threshold is inversely correlated to at least one battery parameter.

15. The power tool of claim 11, wherein the parameter threshold comprises a minimum rotational speed of the electric motor during startup with a locked rotor.

16. The power tool of claim 11, wherein the parameter threshold comprises a minimum number of revolutions of the electric motor during startup with a locked rotor.

17. A control method of a nail gun, the nail gun comprising a housing; an electric motor disposed in the housing; a battery pack to power the electric motor; a firing assembly movable from an initial position to a firing position to drive a nail into a workpiece and movable from the firing position to the initial position within a nailing cycle; a parameter detection unit connected to the electric motor to detect a working parameter of the electric motor; and a controller connected to the parameter detection unit, the control method comprising:
restricting a maximum duty cycle of a startup control signal to being less than or equal to a duty cycle threshold, when the working parameter of the electric motor in a startup process is less than or equal to a parameter threshold.

18. The control method of a nail gun of claim 17, further comprising: setting the duty cycle threshold according to a battery parameter of the battery pack.

19. The control method of a nail gun of claim 17, wherein the working parameter of the electric motor comprises at least one of a rotational speed, a number of revolutions, a startup current, or a startup voltage of the electric motor.

20. The control method of a nail gun of claim 18, wherein the battery parameter of the battery pack comprises at least one of an electric power, a voltage, a temperature, a cell, or a number of parallel cells.

* * * * *